US011330285B2

(12) United States Patent
Chen et al.

(10) Patent No.: US 11,330,285 B2
(45) Date of Patent: May 10, 2022

(54) PICTURE PREDICTION METHOD AND RELATED DEVICE

(71) Applicant: HUAWEI TECHNOLOGIES CO., LTD., Guangdong (CN)

(72) Inventors: Huanbang Chen, Shenzhen (CN); Haitao Yang, Shenzhen (CN); Fan Liang, Guangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 109 days.

(21) Appl. No.: 16/460,029

(22) Filed: Jul. 2, 2019

(65) Prior Publication Data

US 2019/0327483 A1    Oct. 24, 2019

Related U.S. Application Data

(63) Continuation of application No. PCT/CN2018/071351, filed on Jan. 4, 2018.

(30) Foreign Application Priority Data

Jan. 4, 2017  (CN) .......................... 201710005575.6

(51) Int. Cl.
*H04N 19/513*   (2014.01)
*H04N 19/176*   (2014.01)
*H04N 19/54*    (2014.01)

(52) U.S. Cl.
CPC ......... *H04N 19/513* (2014.11); *H04N 19/176* (2014.11); *H04N 19/54* (2014.11)

(58) Field of Classification Search
None
See application file for complete search history.

(56) References Cited

U.S. PATENT DOCUMENTS 9,438,910 B1    9/2016  Han et al.
2005/0240099 A1   10/2005  Sun et al.
(Continued)

FOREIGN PATENT DOCUMENTS

CN    102213762 A    10/2011
CN    102510498 A    6/2012
(Continued)

OTHER PUBLICATIONS

Han Huang et al. Control-Point Representation and Differential Coding Affine-Motion Compensation, IEEE Transactions on Circuits and Systems for Video Technology, vol. 23, No. 10, Oct. 2013, pp. 1651-1660.
(Continued)

*Primary Examiner* — Michael J Hess
(74) *Attorney, Agent, or Firm* — Womble Bond Dickinson (US) LLP

(57) ABSTRACT

A picture prediction method includes: determining a reference block of a current block; obtaining location information and motion information of at least two feature points in the reference block; calculating motion information of each subblock in the current block based on the location information and the motion information of the at least two feature points in the reference block; and performing motion compensation prediction on each subblock in the current block based on the motion information of each subblock in the current block, to obtain a prediction block of the current block.

21 Claims, 16 Drawing Sheets

(56) References Cited

U.S. PATENT DOCUMENTS

| | | |
|---|---|---|
| 2017/0188041 A1 | 6/2017 | Li et al. |
| 2017/0195685 A1 | 7/2017 | Chen et al. |
| 2017/0214932 A1* | 7/2017 | Huang .................. H04N 19/52 |
| 2017/0374379 A1 | 12/2017 | Chen et al. |
| 2018/0070102 A1 | 3/2018 | Zhang et al. |
| 2018/0192047 A1 | 7/2018 | Lv et al. |
| 2018/0234697 A1* | 8/2018 | Jang .................... H04N 19/124 |
| 2019/0124332 A1* | 4/2019 | Lim ..................... H04N 19/137 |

FOREIGN PATENT DOCUMENTS

| | | |
|---|---|---|
| CN | 103051894 A | 4/2013 |
| CN | 104363451 A | 2/2015 |
| CN | 104539966 A | 4/2015 |
| CN | 105163116 A | 12/2015 |
| CN | 106303543 A | 1/2017 |
| WO | 2016141609 A1 | 9/2016 |

OTHER PUBLICATIONS

Huawei Technologies Co., Ltd. et al.,"Affine transform prediction for next generation video coding", Telecommunication Standardization Sector Study Period 2013-2016 ,COM xxx-C1016-E Oct. 2015 English only,total:11pages.

* cited by examiner

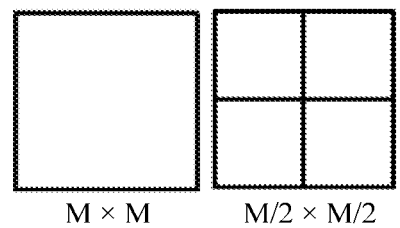
FIG. 1-a
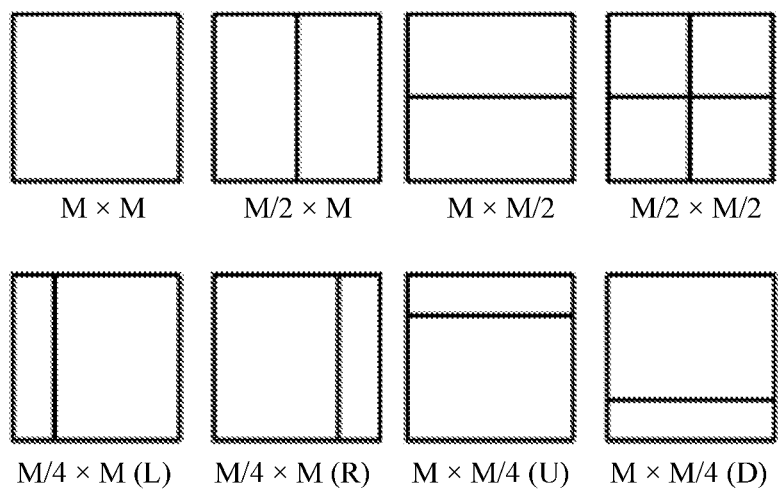
FIG. 1-b

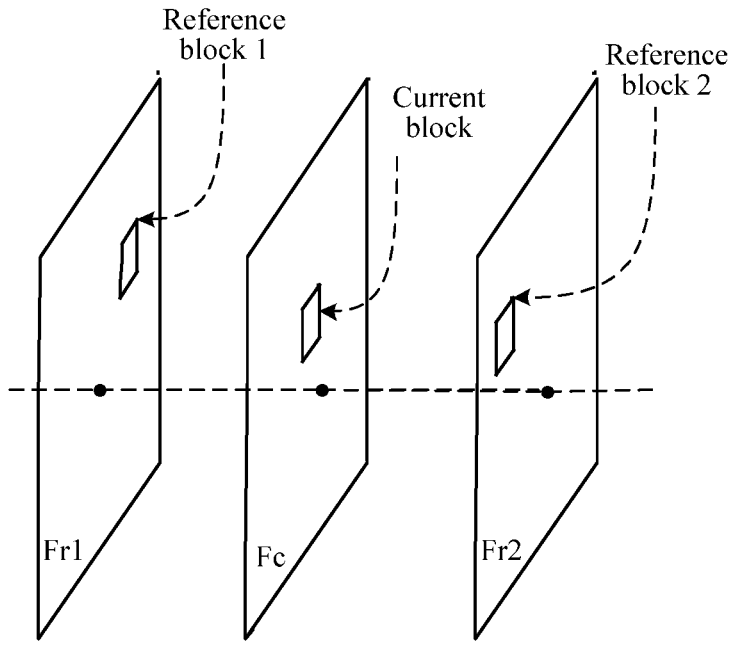
FIG. 1-c
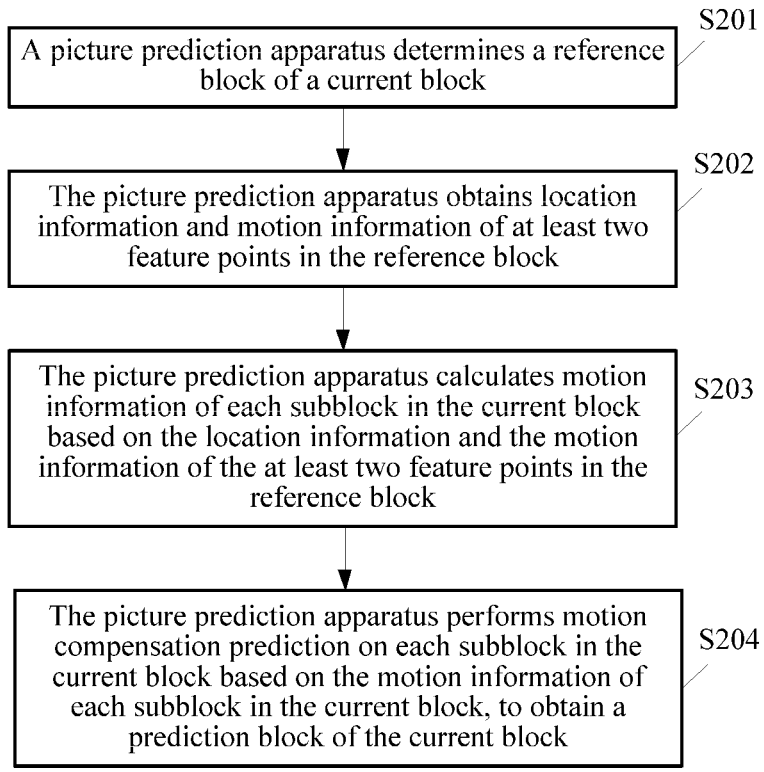
FIG. 2

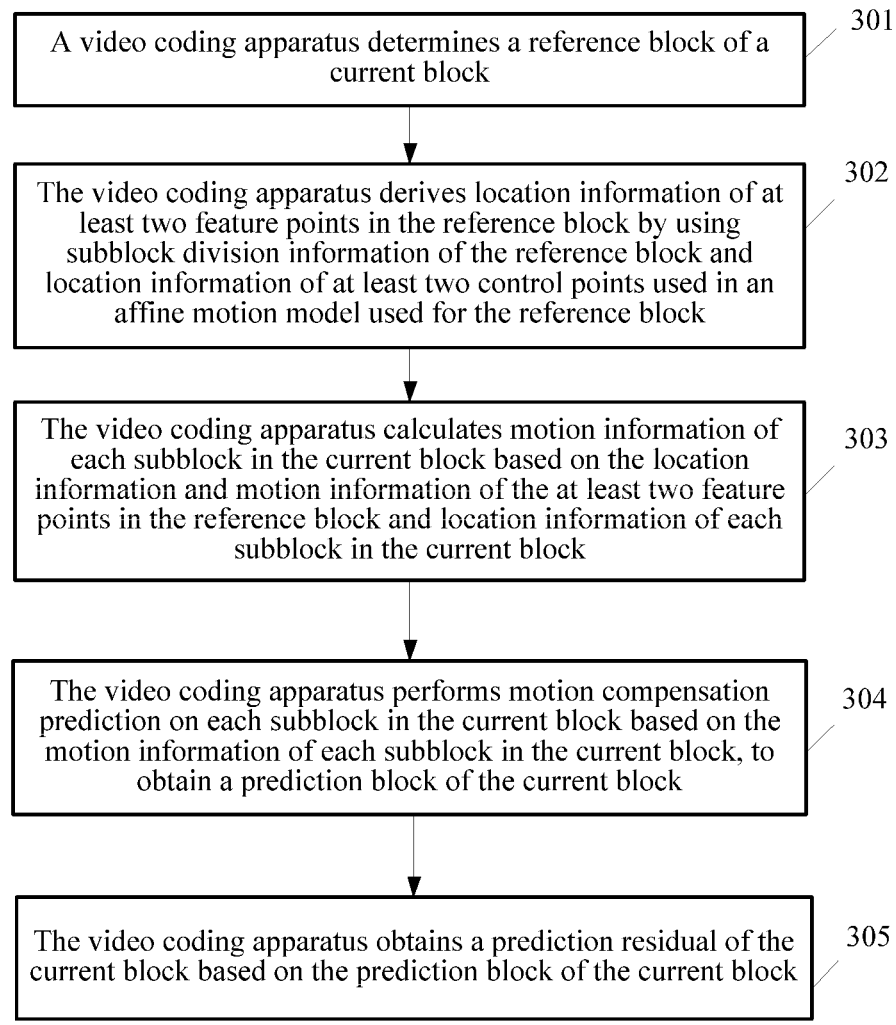
FIG. 3-a
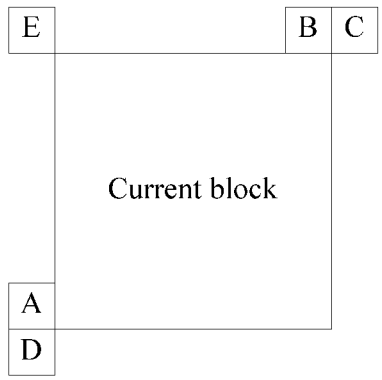
FIG. 3-b

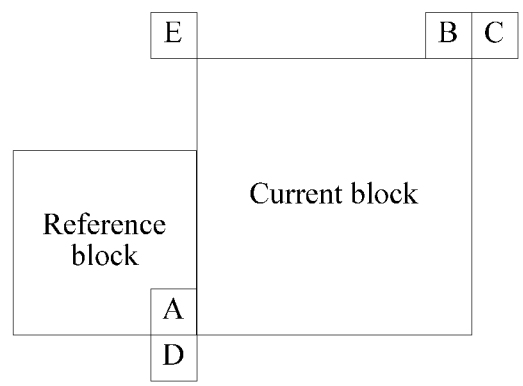
FIG. 3-c
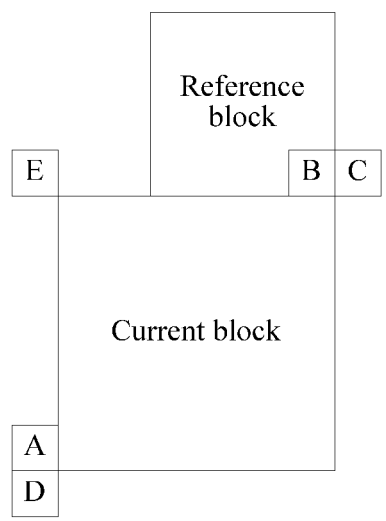
FIG. 3-d

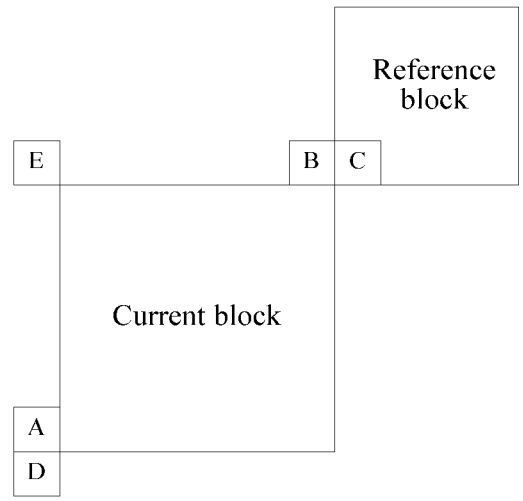
FIG. 3-e
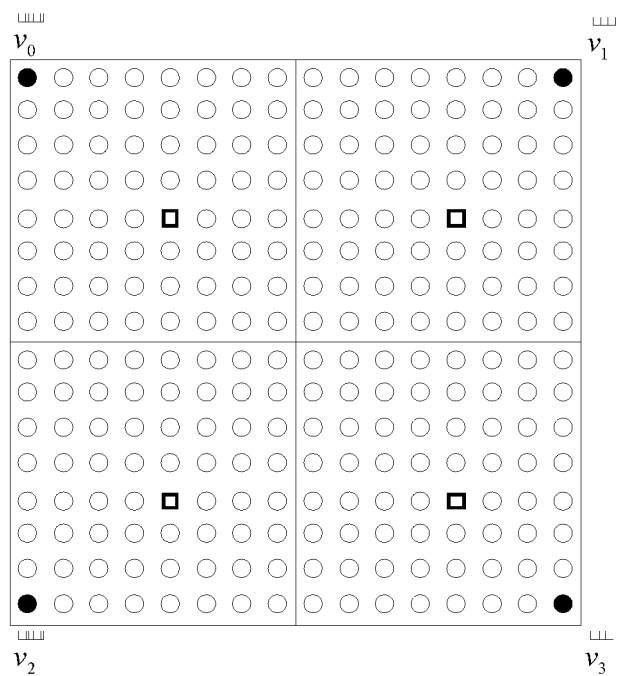
FIG. 3-f

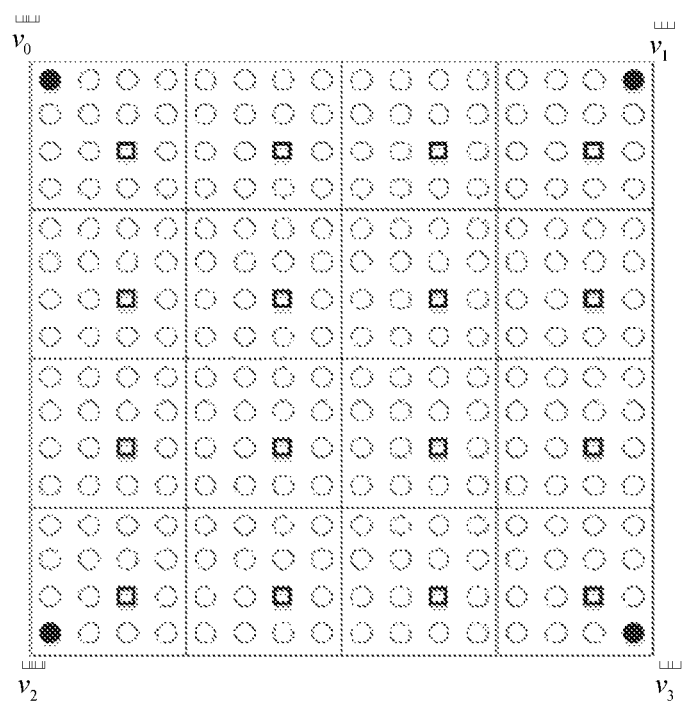
FIG. 3-g

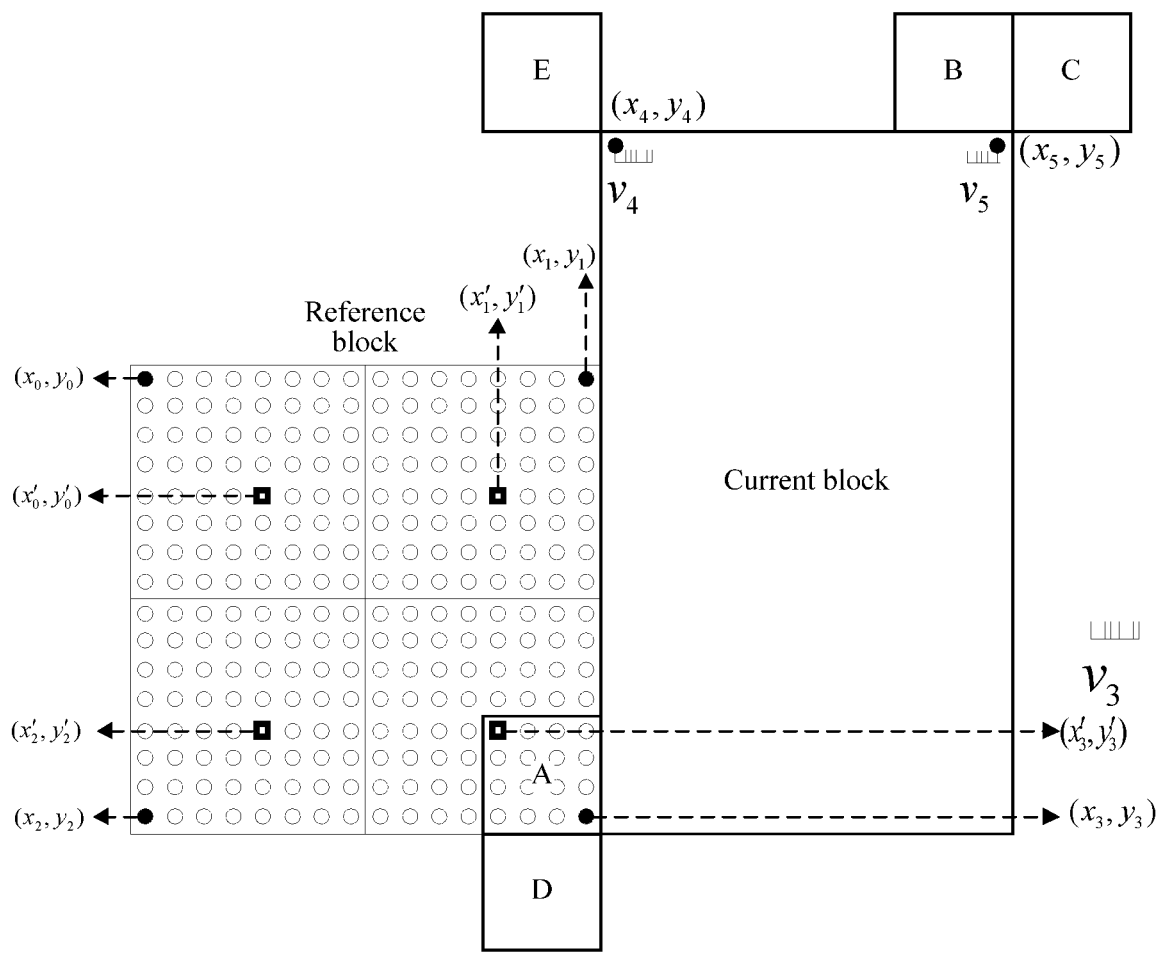
FIG. 3-h

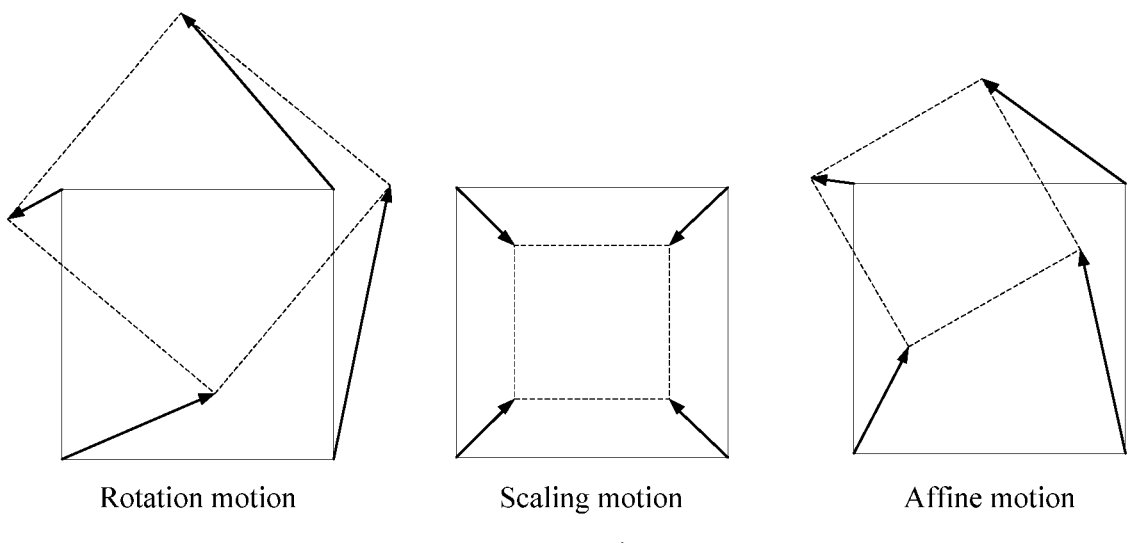
Rotation motion    Scaling motion    Affine motion
FIG. 3-i

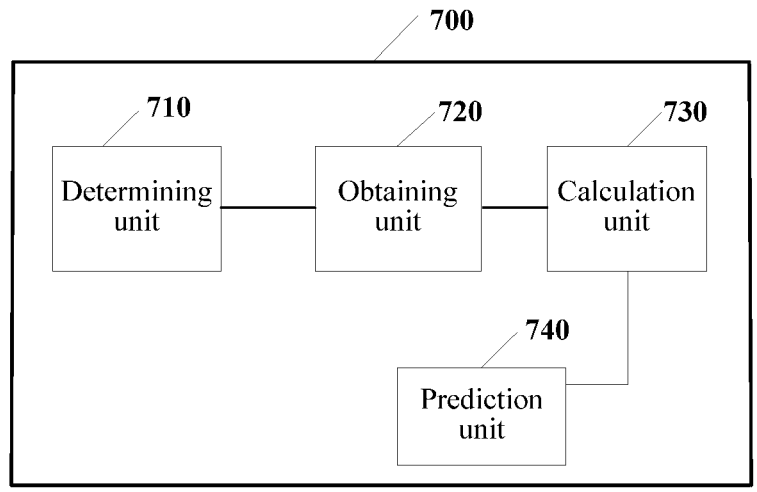
FIG. 7
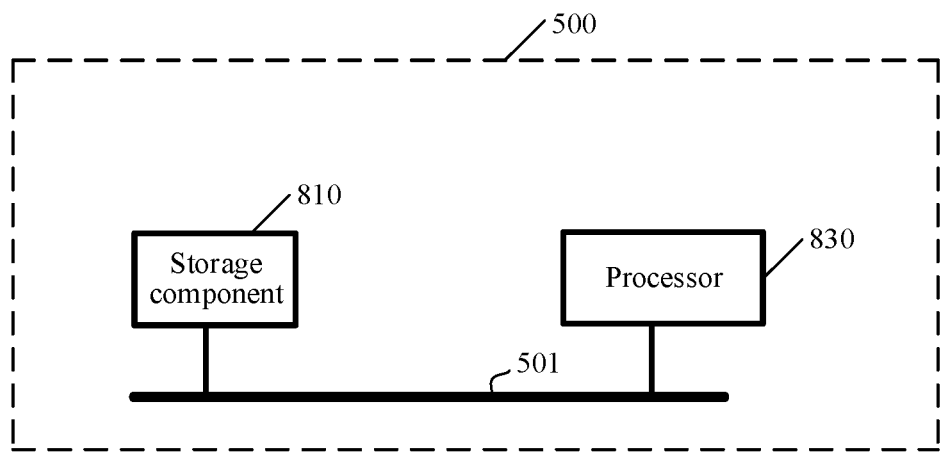
FIG. 8
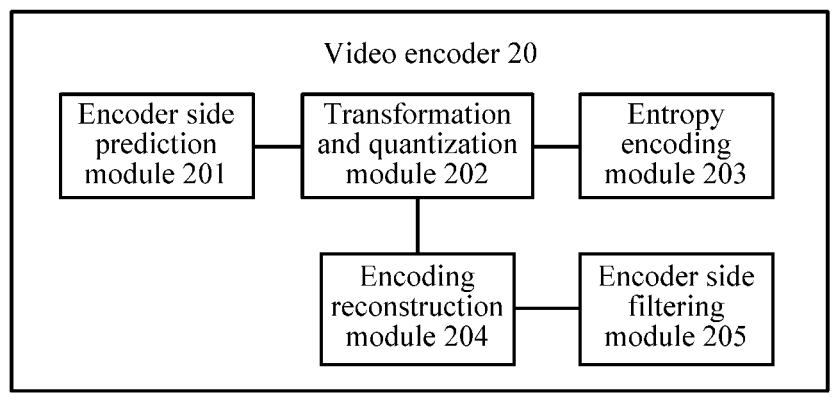
FIG. 9-A

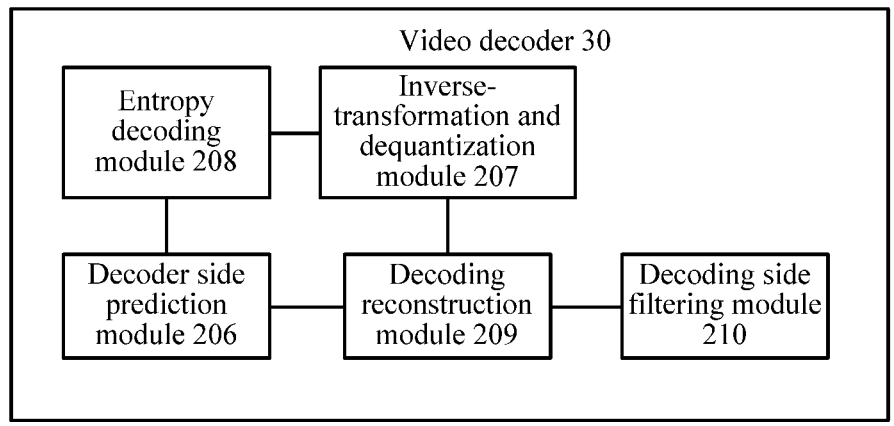
FIG. 9-B
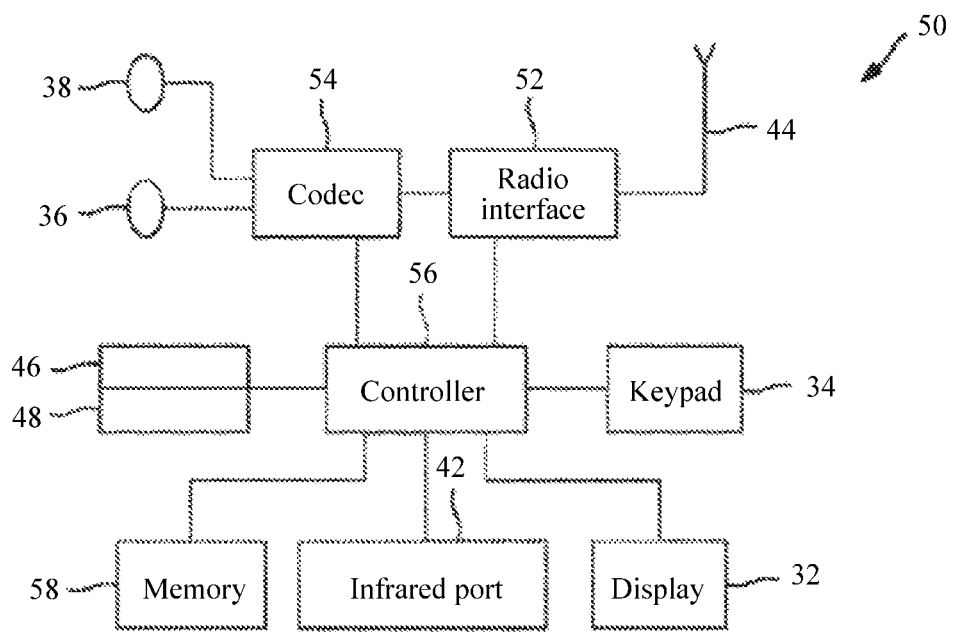
FIG. 10

PICTURE PREDICTION METHOD AND RELATED DEVICE

CROSS-REFERENCE TO RELATED APPLICATIONS

This application is a continuation of International Application No. PCT/CN2018/071351 filed on Jan. 4, 2018, which claims priority to Chinese Patent Application No. 201710005575.6, filed on Jan. 4, 2017, the disclosures of the aforementioned applications are incorporated herein by reference in their entireties.

TECHNICAL FIELD

The present disclosure relates to the video coding and decoding field, and specifically, to a picture prediction method and a related device.

BACKGROUND

As photoelectric collection technologies develop and high-definition digital video requirements increasingly grow, video data volumes become increasingly large, limited heterogeneous transmission bandwidth and diversified video applications constantly impose a higher requirement on video coding efficiency, and formulation of a high efficiency video coding (HEVC) standard is started as required.

A basic principle of video coding and compression is to eliminate redundancy as much as possible by using correlation between space domains, time domains, and code words. Currently, a popular practice is using a block-based hybrid video coding framework, and video coding and compression is implemented by performing steps such as prediction (including intra-frame prediction and inter-frame prediction), conversion, quantization, and entropy encoding. This encoding framework shows very strong vitality, and HEVC still uses this block-based hybrid video coding framework.

In various video coding/decoding solutions, motion estimation/motion compensation is a key technology affecting encoding/decoding performance. In many existing video coding/decoding solutions, it is usually assumed that a motion of an object satisfies a translational motion and various parts of the entire object have the same motion. Existing motion estimation/motion compensation algorithms are almost bloc-based motion compensation algorithms based on a translational motion model. Existing inter-frame prediction is mainly block-based motion compensation prediction based on a translational motion model. Some non-translational motion models (for example, an affine motion model) designed for a non-translational motion are gradually provided.

It is found in practice that in a conventional prediction mechanism based on an affine motion model, precision of predicting a current block by using a reference block is sometimes relatively low. Consequently, it is difficult to satisfy a high-precision prediction requirement in some scenarios.

SUMMARY

Embodiments of the present disclosure provide a picture prediction method and a related device, to improve precision of predicting a current block by using a reference block.

According to a first aspect, a picture prediction method is provided. The method includes:

determining, by a picture prediction apparatus, a reference block of a current block, where the reference block and the current block are spatially adjacent, and the reference block is predicted by using an affine motion model; obtaining location information and motion information of at least two feature points in the reference block, where the at least two feature points are located in subblocks in which at least two control points in the reference block are located, the at least two control points are control points used in the affine motion model used for the reference block (that is, the at least two control points are control points used in the affine motion model used to predict the reference block), and motion information of the subblock in which the feature point is located is obtained based on the motion information of the corresponding feature point (for example, the motion information of the feature point is used as the motion information of the subblock in which the feature point is located); calculating, by the picture prediction apparatus, motion information of each subblock in the current block based on the location information and the motion information of the at least two feature points in the reference block; and performing, by the picture prediction apparatus, motion compensation prediction on each subblock in the current block based on the motion information of each subblock in the current block, to obtain a prediction block of the current block.

In one embodiment, the motion information is, for example, a motion vector. In one embodiment, the location information is, for example, coordinates.

In one embodiment, the affine motion model used for the reference block is, for example, the same as or similar to an affine motion model used for the current block. "The affine motion model used for the reference block" is the affine motion model used to predict the reference block. "The affine motion model used for the current block" is an affine motion model used to predict the current block.

The reference block of the current block may be, for example, a picture block adjacent to an upper left vertex of the current block, a picture block adjacent to a lower left vertex of the current block, a picture block adjacent to an upper right vertex of the current block, or a picture block adjacent to a lower right vertex of the current block. Certainly, the reference block of the current block may alternatively be, for example, another picture block adjacent to the current block.

As can be learned, in the foregoing technical solution, the motion information of each subblock in the current block is calculated based on the location information and the motion information of the at least two feature points in the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used to calculate the motion information of each subblock in the current block are matched at a relatively high degree. It is found in practice that this helps improve accuracy of calculating the motion information of each subblock in the current block, thereby improving precision of predicting the current block by using the reference block.

The picture prediction method provided in this embodiment may be applied to a video coding process or a video decoding process.

According to a second aspect, a picture prediction apparatus is further provided. The apparatus includes:

a determining unit configured to determine a reference block of a current block, where the reference block and the current block are spatially adjacent, and the reference block is predicted by using an affine motion model;

an obtaining unit configured to obtain location information and motion information of at least two feature points in the reference block, where the at least two feature points are located in subblocks in which at least two control points in the reference block are located, the at least two control points are control points used in the affine motion model used for the reference block, and motion information of the subblock in which the feature point is located is obtained based on motion information of the corresponding feature point;

a calculation unit configured to calculate motion information of each subblock in the current block based on the location information and the motion information of the at least two feature points in the reference block; and a prediction unit configured to perform motion compensation prediction on each subblock in the current block based on the motion information of each subblock in the current block, to obtain a prediction block of the current block.

The picture prediction apparatus provided in this embodiment is applied to a video coding apparatus or a video decoding apparatus. The video coding apparatus or the video decoding apparatus may be any apparatus that needs to output or store a video, for example, a device such as a notebook computer, a tablet computer, a personal computer, a mobile phone, or a video server.

The video coding apparatus and the video decoding apparatus may perform subblock division based on a same block division manner agreed on. Alternatively, the video coding apparatus may write a block division manner indication to a bitstream, to notify the video decoding apparatus of a block division manner used by the video coding apparatus, so that the video coding apparatus and the video decoding apparatus use the same block division manner.

With reference to the technical solution according to either of the foregoing aspects, in some embodiments, the feature point is in a central location of the subblock in which the control point in the reference block is located. In other words, the feature point may be a pixel in the central location of the subblock in which the feature point is located. It is found in practice that if motion information (e.g., a motion vector) of the pixel in the central location of the subblock is used as the motion information of the subblock, better prediction precision is desirably obtained.

With reference to the technical solution according to either of the foregoing aspects, in some embodiments, the location information of the feature point in the reference block is obtained by offsetting location information of the control point in the reference block in the following manner: (x',y')=(x+a,y+b).

(x,y) are coordinates of a control point in the reference block, (x',y') are coordinates of a feature point in a subblock in which the control point whose coordinates are (x,y) in the reference block is located, a is a horizontal offset, b is a vertical offset, and a and b are not equal to 0.

With reference to the technical solution according to either of the foregoing aspects, in some embodiments, the at least two control points in the reference block include at least two of an upper left vertex, an upper right vertex, a lower left vertex, and a lower right vertex of the reference block. When location coordinates of the upper left vertex of the reference block are $(x_0,y_0)$, a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases},$$

where $(x_1,y_1)$ are coordinates of the upper right vertex of the reference block, $(x_2,y_2)$ are coordinates of the lower left vertex of the reference block, and $(x_3,y_3)$ are coordinates of the lower right vertex of the reference block.

For example, in some possible implementations, the at least two feature points may include feature points whose coordinates are respectively $(x_0',y_0')$ and $(x_1',y_1')$ in the reference block, where $$\begin{cases} (x_0', y_0') = (x_0 + N_1/2, y_0 + N_2/2) \\ (x_1', y_1') = (x_1 - N_1/2, y_1 + N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_0 + N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, and w is the width of the reference block.

For another example, in some possible implementations, the at least two feature points may include feature points whose coordinates are respectively $(x_0',y_0')$, $(x_1',y_1')$, and $(x_2',y_2')$ in the reference block, where $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, w is the width of the reference block, and h is the height of the reference block.

For another example, in some possible implementations, the at least two feature points include feature points whose coordinates are respectively $(x_0',y_0')$, $(x_1',y_1')$, $(x_2',y_2')$, and $(x_3',y_3')$ in the reference block, where $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \\ (x_3', y_3') = (x_3 - N_1/2, y_3 - N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \\ (x_3', y_3') = (x_0 + w - N_1/2, y_0 + h - N_2/2) \end{cases},$$

where $N_1$ is a width of the subblock in which the control point in the reference block is located, $N_2$ is a height of the subblock in which the control point in the reference block is located, $(x_0, y_0)$ are coordinates of a control point in a subblock in which the feature point $(x_0', y_0')$ in the reference block is located, $(x_1, y_1)$ are coordinates of a control point in a subblock in which the feature point $(x_1', y_1')$ in the reference block is located, $(x_2, y_2)$ are coordinates of a control point in a subblock in which the feature point $(x_2', y_2')$ in the reference block is located, w is the width of the reference block, and h is the height of the reference block.

In some embodiments, the calculating motion information of each subblock in the current block based on the location information and the motion information of the at least two feature points in the reference block includes: calculating the motion information of each subblock in the current block based on the location information and the motion information of the at least two feature points in the reference block and location information of each subblock in the current block.

For example, the calculating the motion information of each subblock in the current block based on the location information and the motion information of the at least two feature points in the reference block and location information of each subblock in the current block includes: calculating the motion information of each subblock in the current block with reference to the following formula and based on the location information and the motion information of the at least two feature points in the reference block and the location information of each subblock in the current block:

$$\begin{cases} vx = \frac{vx_1 - vx_0}{x_1' - x_0'} \times (x - x_0') - \frac{vy_1 - vy_0}{x_1' - x_0'} \times (y - y_0') + vx_0 \\ vy = \frac{vy_1 - vy_0}{x_1' - x_0'} \times (x - x_0') + \frac{vx_1 - vx_0}{x_1' - x_0'} \times (y - y_0') + vy_0 \end{cases} \text{or}$$

$$\begin{cases} vx = \frac{vx_1 - vx_0}{x_1' - x_0'} \times (x - x_0') + \frac{vx_2 - vx_0}{x_2' - x_0'} \times (y - y_0') + vx_0 \\ vy = \frac{vy_1 - vy_0}{x_1' - x_0'} \times (x - x_0') + \frac{vy_2 - vy_0}{y_2' - y_0'} \times (y - y_0') + vy_0 \end{cases} \text{or}$$

$$\begin{cases} vx = \frac{vx_1 - vx_0}{x_1' - x_0'} \times (x - x_0') + \frac{vx_2 - vx_0}{y_2' - y_0'} \times (y - y_0') + \\ \frac{(vx_3 + vx_0) - (vx_1 + vx_2)}{(x_1' - x_0') \times (y_2' - y_0')} \times (x - x_0') \times (y - y_0') + vx_0 \\ vy = \frac{vy_1 - vy_0}{x_1' - x_0'} \times (x - x_0') + \frac{vy_2 - vy_0}{y_2' - y_0'} \times (y - y_0') + \\ \frac{(vy_3 + vy_0) - (vy_1 + vy_2)}{(x_1' - x_0') \times (y_2' - y_0')} \times (x - x_0') \times (y - y_0') + vy_0 \end{cases},$$

the at least two feature points include the feature points whose coordinates are $(x_0',y_0')$ and $(x_1',y_1')$ in the reference block;

the at least two feature points include the feature points whose coordinates are $(x_0',y_0')$, $(x_1',y_1')$, and $(x_2',y_2')$ in the reference block; or the at least two feature points include the feature points whose coordinates are $(x_0',y_0')$, $(x_1',y_1')$, $(x_2',y_2')$, and $(x_3',y_3')$ in the reference block, where $vx_0$ is a horizontal motion vector of the feature point $(x_0',y_0')$, $vy_0$ is a vertical motion vector of the feature point $(x_0',y_0')$; $vx_1$ is a horizontal motion vector of the feature point $(x_1',y_1')$, $vy_1$ is a vertical motion vector of the feature point $(x_1',y_1')$, $vy_2$ is a vertical motion vector of the feature point $(x_2',y_2')$, $vx_2$ is a horizontal motion vector of the feature point $(x_2',y_2')$, $vy_3$ is a vertical motion vector of the feature point $(x_3',y_3')$, and $vx_3$ is a horizontal motion vector of the feature point $(x_3,y_3')$; and vx is a horizontal motion vector of a subblock whose coordinates are (x,y) in the current block, and vy is a vertical motion vector of the subblock whose coordinates are (x,y) in the current block.

In some embodiments, the calculating motion information of each subblock in the current block based on the location information and the motion information of the at least two feature points in the reference block includes: calculating, based on the location information and the motion information of the at least two feature points in the reference block, motion information of at least two control points used in an affine motion model used for the current block; and calculating the motion information of each subblock in the current block based on location information of each subblock in the current block and the motion information and location information of the at least two control points used in the affine motion model used for the current block.

The at least two control points used in the affine motion model used for the current block may include, for example, at least two of the upper left vertex, the lower left vertex, the upper right vertex, and the lower right vertex of the current block.

For example, the calculating, based on the location information and the motion information of the at least two feature points in the reference block, the motion information of at least two control points used in an affine motion model used for the current block includes: calculating, with reference to the following formula and based on the location information and the motion information of the at least two feature points in the reference block, the motion information of the at least two control points used in the affine motion model used for the current block:

$$\begin{cases} vx_4 = \frac{vx_1 - vx_0}{x_1' - x_0'} \times (x_4 - x_0') - \frac{vy_1 - vy_0}{x_1' - x_0'} \times (y_4 - y_0') + vx_0 \\ vy_4 = \frac{vy_1 - vy_0}{x_1' - x_0'} \times (x_4 - x_0') + \frac{vx_1 - vx_0}{x_1' - x_0'} \times (y_4 - y_0') + vy_0 \end{cases}$$

$$\begin{cases} vx_5 = \frac{vx_1 - vx_0}{x_1' - x_0'} \times (x_5 - x_0') - \frac{vy_1 - vy_0}{x_1' - x_0'} \times (y_5 - y_0') + vx_0 \\ vy_5 = \frac{vy_1 - vy_0}{x_1' - x_0'} \times (x_5 - x_0') + \frac{vx_1 - vx_0}{x_1' - x_0'} \times (y_5 - y_0') + vy_0 \end{cases} \text{or}$$

$$\begin{cases} vx_4 = \frac{vx_1 - vx_0}{x_1' - x_0'} \times (x_4 - x_0') + \frac{vx_2 - vx_0}{x_2' - x_0'} \times (y_4 - y_0') + vx_0 \\ vy_4 = \frac{vy_1 - vy_0}{x_1' - x_0'} \times (x_4 - x_0') + \frac{vy_2 - y_0}{y_2' - y_0'} \times (y_4 - y_0') + vy_0 \end{cases}$$

-continued $$\begin{cases} vx_5 = \frac{vx_1 - vx_0}{x_1' - x_0'} \times (x_5 - x_0') + \frac{vx_2 - vx_0}{x_2' - x_0'} \times (y_5 - y_0') + vx_0 \\ vy_5 = \frac{vy_1 - vy_0}{x_1' - x_0'} \times (x_5 - x_0') + \frac{vy_2 - vy_0}{y_2' - y_0'} \times (y_5 - y_0') + vy_0 \end{cases}$$

$$\begin{cases} vx_6 = \frac{vx_1 - vx_0}{x_1' - x_0'} \times (x_6 - x_0') + \frac{vx_2 - vx_0}{x_2' - x_0'} \times (y_6 - y_0') + vx_0 \\ vy_6 = \frac{vy_1 - vy_0}{x_1' - x_0'} \times (x_6 - x_0') + \frac{vy_2 - vy_0}{y_2' - y_0'} \times (y_6 - y_0') + vy_0 \end{cases} \text{ or}$$

$$\begin{cases} vx_4 = \frac{vx_1 - vx_0}{x_1' - x_0'} \times (x_4 - x_0') + \frac{vx_2 - vx_0}{x_2' - x_0'} \times (y_4 - y_0') + \\ \quad \frac{(vx_3 + vx_0) - (vx_1 + vx_2)}{(x_1' - x_0') \times (y_2' - y_0')} \times (x_4 - x_0') \times (y_4 - y_0') + vx_0 \\ vy_4 = \frac{vy_1 - vy_0}{x_1' - x_0'} \times (x_4 - x_0') + \frac{vy_2 - vy_0}{y_2' - y_0'} \times (y_4 - y_0') + \\ \quad \frac{(vy_3 + vy_0) - (vy_1 + vy_2)}{(x_1' - x_0') \times (y_2' - y_0')} \times (x_4 - x_0') \times (y_4 - y_0') + vy_0 \end{cases}$$

$$\begin{cases} vx_5 = \frac{vx_1 - vx_0}{x_1' - x_0'} \times (x_5 - x_0') + \frac{vx_2 - vx_0}{x_2' - x_0'} \times (y_5 - y_0') + \\ \quad \frac{(vx_3 + vx_0) - (vx_1 + vx_2)}{(x_1' - x_0') \times (y_2' - y_0')} \times (x_5 - x_0') \times (y_5 - y_0') + vx_0 \\ vy_5 = \frac{vy_1 - vy_0}{x_1' - x_0'} \times (x_5 - x_0') + \frac{vy_2 - vy_0}{y_2' - y_0'} \times (y_5 - y_0') + \\ \quad \frac{(vy_3 + vy_0) - (vy_1 + vy_2)}{(x_1' - x_0') \times (y_2' - y_0')} \times (x_5 - x_0') \times (y_5 - y_0') + vy_0 \end{cases}$$

$$\begin{cases} vx_6 = \frac{vx_1 - vx_0}{x_1' - x_0'} \times (x_6 - x_0') + \frac{vx_2 - vx_0}{x_2' - x_0'} \times (y_6 - y_0') + \\ \quad \frac{(vx_3 + vx_0) - (vx_1 + vx_2)}{(x_1' - x_0') \times (y_2' - y_0')} \times (x_6 - x_0') \times (y_6 - y_0') + vx_0 \\ vy_6 = \frac{vy_1 - vy_0}{x_1' - x_0'} \times (x_6 - x_0') + \frac{vy_2 - vy_0}{y_2' - y_0'} \times (y_6 - y_0') + \\ \quad \frac{(vy_3 + vy_0) - (vy_1 + vy_2)}{(x_1' - x_0') \times (y_2' - y_0')} \times (x_6 - x_0') \times (y_6 - y_0') + vy_0 \end{cases}$$

$$\begin{cases} vx_7 = \frac{vx_1 - vx_0}{x_1' - x_0'} \times (x_7 - x_0') + \frac{vx_2 - vx_0}{x_2' - x_0'} \times (y_7 - y_0') + \\ \quad \frac{(vx_3 + vx_0) - (vx_1 + vx_2)}{(x_1' - x_0') \times (y_2' - y_0')} \times (x_7 - x_0') \times (y_7 - y_0') + vx_0 \\ vy_7 = \frac{vy_1 - vy_0}{x_1' - x_0'} \times (x_7 - x_0') + \frac{vy_2 - vy_0}{y_2' - y_0'} \times (y_7 - y_0') + \\ \quad \frac{(vy_3 + vy_0) - (vy_1 + vy_2)}{(x_1' - x_0') \times (y_2' - y_0')} \times (x_7 - x_0') \times (y_7 - y_0') + vy_0 \end{cases},$$

where the at least two feature points include the feature points whose coordinates are $(x_0',y_0')$ and $(x_1',y_1')$ in the reference block;

the at least two feature points include the feature points whose coordinates are $(x_0',y_0')$, $(x_1',y_1')$, and $(x_2',y_2')$ in the reference block; or the at least two feature points include the feature points whose coordinates are $(x_0',y_0')$, $(x_1',y_1')$, $(x_2',y_2')$, and $(x_3',y_3')$ in the reference block, where the at least two control points used in the affine motion model used for the current block include control points whose coordinates are respectively $(x_4,y_4)$ and $(x_5,y_5)$ in the current block; the at least two control points used in the affine motion model used for the current block include control points whose coordinates are respectively $(x_4,y_4)$, $(x_5,y_5)$, and $(x_6,y_6)$ in the current block; or the at least two control points used in the affine motion model used for the current block include control points whose coordinates are respectively $(x_4,y_4)$, $(x_5,y_5)$, $(x_6,y_6)$ and $(x_7,y_7)$ in the current block; and $vx_4$ is a horizontal motion vector of the control point $(x_4,y_4)$, $vy_4$ is a vertical motion vector of the control point $(x_4,y_4)$; $vx_5$ is a horizontal motion vector of the control point $(x_5,y_5)$ $vy_5$ is a vertical motion vector of the control point $(x_5,y_5)$, $vx_6$ is a horizontal motion vector of the control point $(x_6,y_6)$, $vy_6$ is a vertical motion vector of the control point $(x_6,y_6)$, $vx_7$ is a horizontal motion vector of the control point $(x_7,y_7)$, and $vy_7$ is a vertical motion vector of the control point $(x_7,y_7)$.

For example, the calculating the motion information of each subblock in the current block based on location information of each subblock in the current block and the motion information and location information of the at least two control points used in the affine motion model used for the current block includes: calculating the motion information of each subblock in the current block with reference to the following formula and based on the location information of each subblock in the current block and the motion information and the location information of the at least two control points used in the affine motion model used for the current block:

$$\begin{cases} vx = \frac{vx_5 - vx_4}{x_5 - x_4} \times (x - x_4) - \frac{vy_5 - vy_4}{x_5 - x_4} \times (y - y_4) + vx_4 \\ vy = \frac{vy_5 - vy_4}{x_5 - x_4} \times (x - x_4) + \frac{vx_1 - vx_0}{x_5 - x_4} \times (y - y_4) + vy_4 \end{cases} \text{ or}$$

$$\begin{cases} vx = \frac{vx_5 - vx_4}{x_5 - x_4} \times (x - x_4) + \frac{vx_6 - vx_4}{x_6 - x_4} \times (y - y_4) + vx_4 \\ vy = \frac{vy_5 - vy_4}{x_5 - x_4} \times (x - x_4) + \frac{vy_6 - vy_4}{x_6 - x_4} \times (y - y_4) + vy_4 \end{cases} \text{ or}$$

$$\begin{cases} vx = \frac{vx_5 - vx_4}{x_5 - x_4} \times (x - x_4) + \frac{vx_6 - vx_4}{y_6 - y_4} \times (y - y_4) + \frac{(vx_7 + vx_4) - (vx_5 + vx_6)}{(x_5 - x_4) \times (y_6 - y_4)} \times (x - x_4) \times (y - y_4) + vx_4 \\ vy = \frac{vy_5 - vy_4}{x_5 - x_4} \times (x - x_4) + \frac{vy_6 - vy_4}{y_6 - y_4} \times (y - y_4) + \frac{(vy_7 + vy_4) - (vy_5 + vy_6)}{(x_5 - x_4) \times (y_6 - y_4)} \times (x - x_4) \times (y - y_4) + vy_4 \end{cases},$$

where vx is a horizontal motion vector of a subblock whose coordinates are (x,y) in the current block, and vy is a vertical motion vector of the subblock whose coordinates are (x,y) in the current block.

According to a third aspect, a picture prediction apparatus is further provided. The apparatus includes: a processor and a storage component coupled to each other. The processor is configured to invoke code stored in the memory/storage component, to perform some or all steps in any picture prediction method according to the embodiments of the present disclosure.

According to a fourth aspect, a video system is provided. The system includes: a video coding apparatus and a video decoding apparatus. The video coding apparatus or the video decoding apparatus is configured to perform some or all steps in any picture prediction method according to the embodiments of the present disclosure.

In addition, according to a fifth aspect, a computer-readable storage medium is provided. The computer-readable storage medium stores program code. The program code includes an instruction used to perform some or all steps in any picture prediction method according to the embodiments of the present disclosure.

In addition, according to a sixth aspect, a computer program product is provided. When the computer program product runs on a computer, the computer is enabled to perform some or all steps in any picture prediction method according to the embodiments of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

FIG. 1-a and FIG. 1-b are several schematic diagrams of dividing a picture block according to one embodiment;

FIG. 1-c is a schematic diagram of inter-frame prediction according to one embodiment;

FIG. 2 is a schematic flowchart of a picture prediction method according to one embodiment;

FIG. 3-a is a schematic flowchart of another picture prediction method according to one embodiment;

FIG. 3-b is a schematic diagram of a possible location of a reference block according to one embodiment;

FIG. 3-c to FIG. 3-e are schematic diagrams of reference blocks according to one embodiment;

FIG. 3-f and FIG. 3-g are schematic diagrams of subblock division of reference blocks according to one embodiment;

FIG. 3-h is a schematic diagram of a possible positional relationship between a control point and a feature point in a reference block according to one embodiment;

FIG. 3-i is a schematic diagram of several non-translational motions according to one embodiment;

FIG. 7 is a schematic diagram of a picture prediction apparatus according to one embodiment;

FIG. 8 is a schematic diagram of another picture prediction apparatus according to one embodiment;

FIG. 9-A is a schematic diagram of a video encoder according to one embodiment;

FIG. 9-B is a schematic diagram of a video decoder according to one embodiment;

FIG. 10 is a schematic block diagram of an electronic apparatus according to one embodiment;

DESCRIPTION OF EMBODIMENTS

Figure 4:
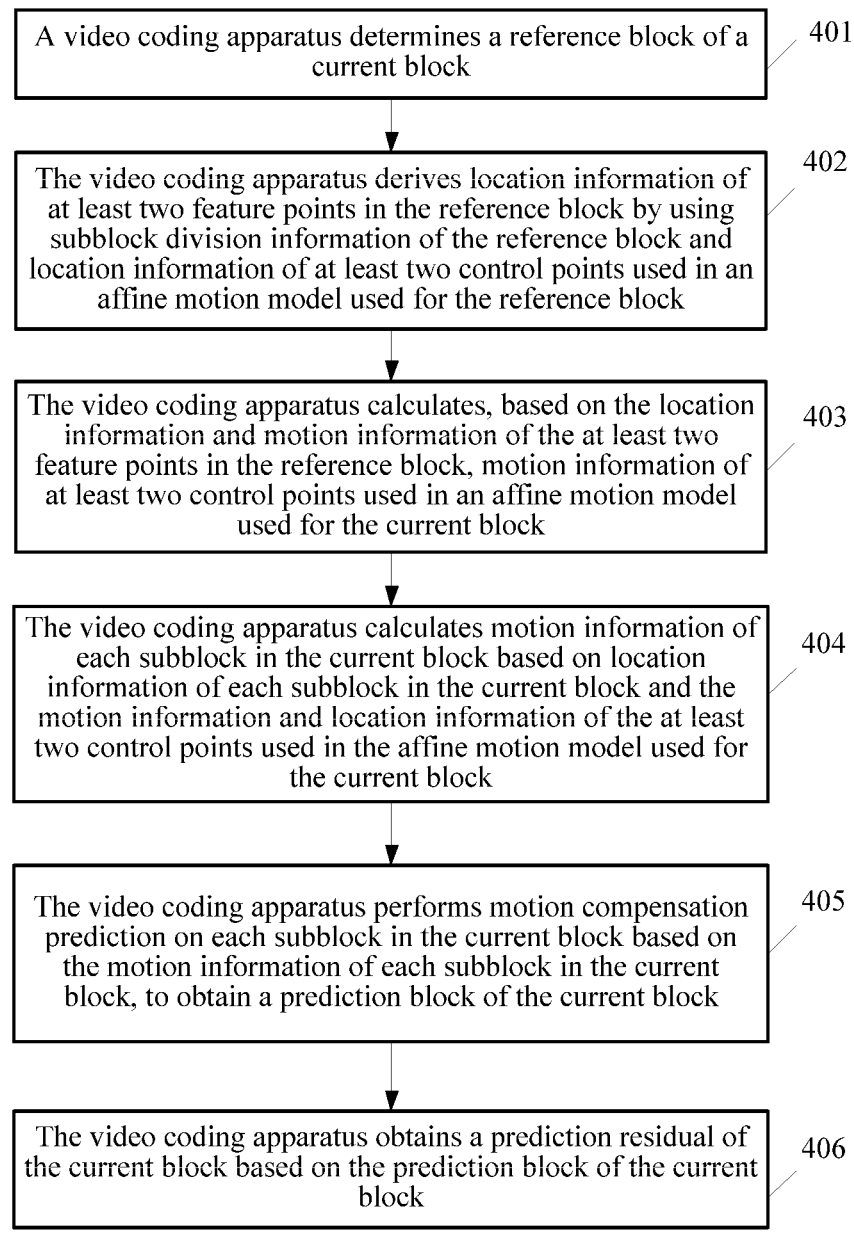
FIG. 4 is a schematic flowchart of another picture prediction method according to one embodiment.

The embodiments of the present disclosure provide a picture prediction method and a related device.

In the specification, claims, and accompanying drawings of the present disclosure, the terms "first", "second", "third", and so on are intended to distinguish between different objects but do not indicate a particular order. In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first briefly describes some concepts that may be mentioned in the embodiments of the present disclosure.

In most encoding frameworks, a video sequence includes a series of pictures, the picture is further divided into slices, and the slice is further divided into blocks. Video coding is performed on a per-block basis, and encoding processing may be performed from an upper left corner of a picture row by row from left to right and from top to bottom. In some new video coding standards, the concept of block is further extended. In the H.264 standard, there is a macroblock (MB), and the MB may be further divided into a plurality of prediction blocks that may be used for predictive coding. In the HEVC standard, basic concepts such as a coding unit (CU), a prediction unit (PU), and a transform unit (TU) are used, a plurality of units are obtained by division based on functions, and a new tree-based structure is used for description. For example, the CU may be divided into smaller CUs based on a quadtree, and the smaller CU may continue to be divided to form a quadtree structure. The PU and the TU also have a similar tree structure. All the CU, the PU, and the TU essentially belong to the concept of block. The CU is similar to a macroblock MB or an encoding block and is a basic unit for dividing and encoding an encoding picture. The PU may correspond to a prediction block and is a basic unit for predictive coding. The CU is further divided into a plurality of PUs based on a division mode. The TU may correspond to a transformation block and is a basic unit for transforming a prediction residual. In the High Efficiency Video Coding (HEVC) standard, the CU, the PU, and the TU may be collectively referred to as a coding tree block (CTB) or the like.

In the HEVC standard, sizes of coding units may include four levels: 64×64, 32×32, 16×16, and 8×8, and a coding unit at each level may be divided into prediction units with different sizes based on intra-frame prediction and inter-frame prediction. For example, as shown in FIG. 1-a and FIG. 1-b, FIG. 1-a shows an example of a prediction unit division manner corresponding to intra-frame prediction, and FIG. 1-b shows an example of several prediction unit division manners corresponding to inter-frame prediction. FIG. 1-c is a schematic diagram of inter-frame prediction. Existing inter-frame prediction is mainly block-based motion compensation prediction based on a translational motion model. Some non-translational motion models (for example, an affine motion model) designed for a non-translational motion are also gradually provided. FIG. 3-i shows examples of non-translational motion manners such as a rotation motion, a scaling motion, and an affine motion.

In a development and evolution process of video coding technologies, video coding experts in the art strive to improve encoding efficiency by using time and spatial correlation between adjacent encoding blocks/decoding blocks with various methods. For example, in the H264/advanced video coding (AVC) standard, skip mode encoding and direct mode encoding become effective tools for improving encoding efficiency. A block using these two encoding modes at a low bit rate may usually occupy more than half of an entire encoding sequence. When the skip mode is used for encoding, a skip mode tag is transferred in a bitstream, a motion vector of a current picture block may be derived by using a surrounding motion vector, and a value of a reference block is directly copied as a reconstruction value of the current picture block based on the motion vector. When the direct mode is used for encoding, an encoder may derive a motion vector of a current picture block by using a surrounding motion vector, directly copy a value of a reference block as a predictor of the current picture block based on the motion vector, and encode and predict the current picture block on an encoder side by using the predictor.

The following continues to discuss technical solutions in the embodiments of the present disclosure.

The following first describes a picture prediction method provided in the embodiments of the present disclosure. The picture prediction method provided in the embodiments of the present disclosure is performed by a video coding apparatus or a video decoding apparatus. The video coding apparatus or the video decoding apparatus may be any apparatus that needs to output or store a video, for example, a device such as a notebook computer, a tablet computer, a personal computer, a mobile phone, or a video server.

FIG. 2 is a schematic flowchart of a picture prediction method according to one embodiment. As shown in the example in FIG. 2, the picture prediction method may include:

S201: A picture prediction apparatus determines a reference block of a current block.

The reference block (that is, a reference picture block) and the current block (that is, a current picture block) are spatially adjacent. The reference block is predicted (e.g., motion compensation prediction) by using an affine motion model. For example, on an encoder side or a decoder side, a picture block may be selected as the reference block of the current block based on a preset selection policy from blocks spatially adjacent to the current block.

The reference block of the current block may be, for example, a picture block adjacent to an upper left vertex of the current block, a picture block adjacent to a lower left vertex of the current block, a picture block adjacent to an upper right vertex of the current block, or a picture block adjacent to a lower right vertex of the current block. Certainly, the reference block of the current block may alternatively be, for example, another picture block adjacent to the current block.

S202: The picture prediction apparatus obtains location information and motion information of at least two feature points in the reference block.

The at least two feature points are located in subblocks in which at least two control points in the reference block are located. The at least two control points are control points used in the affine motion model used for the reference block. Motion information of the subblock in which the feature point is located is obtained based on the motion information of the corresponding feature point (for example, the motion information of the feature point is used as the motion information of the subblock in which the feature point is located).

It may be understood that the at least two feature points may be, for example, two, three, four, or another quantity of feature points.

It may be understood that the at least two control points may be, for example, two, three, four, or another quantity of control points.

For example, the control points used in the affine motion model used to predict the reference block may include at least two of an upper left vertex, a lower left vertex, an upper right vertex, and a lower right vertex of the reference block. When location coordinates of the upper left vertex of the reference block are $(x_0, y_0)$, a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases},$$

where $(x_1, y_1)$ are coordinates of the upper right vertex of the reference block, $(x_2, y_2)$ are coordinates of the lower left vertex of the reference block, and $(x_3, y_3)$ are coordinates of the lower right vertex of the reference block.

For example, the feature point may be in a central location of the subblock in which the control point in the reference block is located. In other words, the feature point may be a pixel in the central location of the subblock in which the feature point is located. It is found in practice that if motion information (a motion vector) of the pixel in the central location of the subblock is used as the motion information of the subblock, better prediction precision is desirably obtained.

For example, assuming that the control points used in the affine motion model used to predict the reference block include the upper left vertex, the lower left vertex, and the upper right vertex, the at least two feature points in the reference block, for example, may include at least two of the following pixels: a pixel in a central location of a subblock in which the upper left vertex of the reference block is located, a pixel in a central location of a subblock in which the lower left vertex is located, and a pixel in a central location of a subblock in which the upper right vertex is located.

In one embodiment, the motion information is, for example, a motion vector. In one embodiment, the location information is, for example, coordinates.

In one embodiment, the affine motion model used to predict the reference block is, for example, the same as or similar to an affine motion model used to predict the current block.

The location information of the at least two feature points (the at least two feature points are, for example, two, three, or four feature points) used in the affine motion model used for the reference block may be obtained by offsetting location information of the control points in the reference block in the following manner: (x',y')=(x+a,y+b). (x,y) are coordinates of a control point in the reference block (x is a horizontal coordinate and y is a vertical coordinate), (x',y') are coordinates of a feature point corresponding to the control point whose coordinates are (x,y) in the reference block (x' is a horizontal coordinate and y' is a vertical coordinate), a is a horizontal offset, b is a vertical offset, and a and b are not equal to 0.

For example, a may be equal to 1, 2, 3, 4, 5, 6, 7, −1, −2, −3, −4, −5, or another value.

For example, b may be equal to 1, 2, 3, 4, 5, 6, 7, −1, −2, −3, −4, −5, or another value.

S203: The picture prediction apparatus calculates motion information of each subblock in the current block based on the location information and the motion information of the at least two feature points in the reference block.

For example, the calculating motion information of each subblock in the current block based on the location information and the motion information of the at least two feature points in the reference block includes: calculating the motion information of each subblock in the current block based on the location information and the motion information of the at least two feature points in the reference block and location information of each subblock in the current block.

For another example, the calculating motion information of each subblock in the current block based on the location information and the motion information of the at least two feature points in the reference block includes: calculating, based on the location information and the motion information of the at least two feature points in the reference block, motion information of at least two control points used in an affine motion model used for the current block; and calculating the motion information of each subblock in the current block based on location information of each subblock in the current block and the motion information and location information of the at least two control points used in the affine motion model used for the current block.

S204: The picture prediction apparatus performs motion compensation prediction on each subblock in the current block based on the motion information of each subblock in the current block, to obtain a prediction block of the current block.

As can be learned from the foregoing, in the solution provided in this embodiment, the motion information of each subblock in the current block is calculated based on the location information and the motion information of the at least two feature points in the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used to calculate the motion information of each subblock in the current block are matched at a relatively high degree. It is found in practice that this helps improve accuracy of calculating the motion information of each subblock in the current block, thereby improving precision of predicting the current block by using the reference block.

For example, if the motion information of each subblock in the current block is calculated based on the motion information of the feature point in the reference block and the location information of the control point, because the motion information of the feature point and the location information of the control point are not matched (at least a degree of matching is lower than that of matching between the motion information and the location information of the feature point), precision of predicting the current block is probably affected.

The picture prediction method may be applied to a video coding process or the picture prediction method may be applied to a video decoding process.

For ease of better understanding the technical solutions in the embodiments of the present disclosure, the following provides detailed descriptions of examples from the perspective of an encoder side and a decoder side.

FIG. 3-*a* is a schematic flowchart of another picture prediction method according to one embodiment. As shown in the example in FIG. 3-*a*, the another picture prediction method may include:

301: A video coding apparatus determines a reference block of a current block.

For example, as shown in FIG. 3-*b*, the video coding apparatus may traverse, based on a sequence of pixel units A, B, C, D, and E, five picture blocks spatially adjacent to the current block, and may use, as the reference block of the current block, a first found picture block predicted by using an affine motion model. Certainly, the video coding apparatus may alternatively use, as the reference block of the current block, any picture block that is predicted by using an affine motion model and that is of picture blocks in which the pixel units A, B, C, D, and E are located.

The pixel unit A and the pixel unit D are adjacent to a lower left vertex of the current block, the pixel unit B and the pixel unit C are adjacent to an upper right vertex of the current block, and the pixel unit E is adjacent to an upper left vertex of the current block.

In one embodiment, the pixel unit may include one or more pixels. For example, the pixel unit may be a 2×2 pixel block, a 2×1 pixel block, a 1×1 pixel block, a 4×4 pixel block, a 4×2 pixel block, or the like.

For example, the picture blocks in five locations spatially adjacent to the current block are traversed based on the sequence of A, B, C, D, and E shown in FIG. 3-*b*. Assuming that the picture block in which the pixel unit A is located is predicted by using the affine motion model, as shown in the example in FIG. 3-*c*, the picture block in which the pixel unit A is located may be used as the reference block of the current block. Alternatively assuming that the picture block in which the pixel unit A is located is not predicted by using the affine motion model, and the picture block in which the pixel unit B is located is predicted by using the affine motion model, as shown in the example in FIG. 3-*d*, the picture block in which the pixel unit B is located may be used as the reference block of the current block. Alternatively assuming that neither of the picture blocks in which the pixel unit A and the pixel unit B are located is predicted by using the affine motion model, and the picture block in which the pixel unit C is located is predicted by using the affine motion model, as shown in the example in FIG. 3-*e*, the picture block in which the pixel unit C is located may be used as the reference block of the current block. Alternatively assuming that neither of the picture blocks in which the pixel unit A, the pixel unit B, and the pixel unit C are located is predicted by using the affine motion model, and the picture block in which the pixel unit D is located is predicted by using the affine motion model, the picture block in which the pixel unit D is located may be used as the reference block of the current block. Alternatively assuming that neither of the picture blocks in which the pixel unit A, the pixel unit B, the pixel unit C, and the pixel unit D are located is predicted by using the affine motion model, and the picture block in which the pixel unit E is located is predicted by using the affine motion model, the picture block in which the pixel unit E is located may be used as the reference block of the current block.

In addition, in some other possible implementations, when at least two of the picture blocks in which the pixel units A, B, C, D, and E are located are predicted by using the affine motion model, the picture blocks predicted by using the affine motion model may be used as candidate reference blocks, prediction quality is separately calculated when the current block is predicted by using the candidate reference blocks, and a candidate reference block having best prediction quality is used as the reference block of the current block.

Certainly, a mechanism of selecting the reference block of the current block is not limited to the foregoing examples. A decoder side selects the reference block of the current block by using a same policy as that of an encoder side.

302: The video coding apparatus derives location information of at least two feature points in the reference block by using subblock division information of the reference block and location information of at least two control points used in an affine motion model used for the reference block.

The at least two feature points are located in subblocks in which the at least two control points in the reference block are located, and motion information of the feature point is used as motion information of the subblock in which the feature point is located.

It should be noted that the encoder side and the decoder side may perform subblock division on the reference block in a same subblock division manner. For example, as shown in the example in FIG. 3-*f*, 4*4 subblocks may be fixedly obtained by division. Alternatively, for example, as shown in the example in FIG. 3-*g*, 8*8 subblocks may be fixedly obtained by division. Certainly, a corresponding subblock division manner may alternatively be derived by using size information of the reference block, vertex motion information, and the like. This is not limited herein.

The following separately describes examples in which the at least two feature points include two, three, and four feature points.

For example, the at least two feature points may include feature points whose coordinates are respectively $(x_0',y_0')$ and $(x_1',y_1')$ in the reference block, where $$\begin{cases} (x'_0, y'_0) = (x_0 + N_1/2, y_0 + N_2/2) \\ (x'_1, y'_1) = (x_1 - N_1/2, y_1 + N_2/2) \end{cases} \text{ or }$$

$$\begin{cases} (x'_0, y'_0) = (x_0 + N_1/2, y_0 + N_2/2) \\ (x'_1, y'_1) = (x_0 + w - N_1/2, y_1 + N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, and w is a width of the reference block.

For another example, the at least two feature points include the feature points whose coordinates are respectively $(x_0',y_0')$, $(x_1',y_1')$ and $(x_2',y_2')$ in the reference block, where $$\begin{cases} (x'_0, y'_0) = (x_0 + N_1/2, y_0 + N_2/2) \\ (x'_1, y'_1) = (x_1 - N_1/2, y_1 + N_2/2) \\ (x'_2, y'_2) = (x_2 + N_1/2, y_2 - N_2/2) \end{cases} \text{ or }$$

$$\begin{cases} (x'_0, y'_0) = (x_0 + N_1/2, y_0 + N_2/2) \\ (x'_1, y'_1) = (x_0 + w - N_1/2, y_0 + N_2/2) \\ (x'_2, y'_2) = (x_0 + N_1/2, y_0 + h - N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, w is a width of the reference block, and h is a height of the reference block.

For another example, in some possible implementations, when the at least two feature points include feature points whose coordinates are respectively $(x_0',y_0')$, $(x_1',y_1')$, $(x_2',y_2')$, and $(x_3',y_3')$ in the reference block, where $$\begin{cases} (x'_0, y'_0) = (x_0 + N_1/2, y_0 + N_2/2) \\ (x'_1, y'_1) = (x_1 - N_1/2, y_1 + N_2/2) \\ (x'_2, y'_2) = (x_2 + N_1/2, y_2 - N_2/2) \\ (x'_3, y'_3) = (x_3 - N_1/2, y_3 - N_2/2) \end{cases} \text{ or }$$

$$\begin{cases} (x'_0, y'_0) = (x_0 + N_1/2, y_0 + N_2/2) \\ (x'_1, y'_1) = (x_0 + w - N_1/2, y_0 + N_2/2) \\ (x'_2, y'_2) = (x_0 + N_1/2, y_0 + h - N_2/2) \\ (x'_3, y'_3) = (x_0 + w - N_1/2, y_0 + h - N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, $(x_3,y_3)$ are coordinates of a control point in a subblock in which the feature point $(x_3',y_3')$ in the reference block is located, w is a width of the reference block, and h is a height of the reference block.

FIG. 3-*h* shows an example of a possible positional relationship between a control point and a feature point in each subblock in the reference block. The control point is at a vertex of the subblock, a corresponding feature point is in a central location of the subblock, and when the subblock includes a plurality of central locations, the feature point may be in any central location of the subblock.

For example, the control points used in the affine motion model used to predict the reference block may include at least two of an upper left vertex, a lower left vertex, an upper right vertex, and a lower right vertex of the reference block. When location coordinates of the upper left vertex of the reference block are $(x_0,y_0)$, a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases},$$

where $(x_1,y_1)$ are coordinates of the upper right vertex of the reference block, $(x_2,y_2)$ are coordinates of the lower left vertex of the reference block, and $(x_3,y_3)$ are coordinates of the lower right vertex of the reference block.

Certainly, the positional relationship between the control point and the feature point in the same subblock is not limited to the example shown in FIG. 3-h.

It may be understood that an implementation in which the at least two feature points are in another case is deduced by analogy.

303: The video coding apparatus calculates motion information of each subblock in the current block based on the location information and motion information of the at least two feature points in the reference block and location information of each subblock in the current block.

The motion information of each subblock in the current block may be used as motion information of all pixels in the corresponding subblock. Location information of a central pixel of the subblock in the current block may be used as location information of the corresponding subblock.

For example, the motion information of each subblock in the current block may be calculated with reference to the following formula and based on the location information and the motion information of the at least two feature points in the reference block and the location information of each subblock in the current block:

$$\begin{cases} vx = \frac{vx_1 - vx_0}{x'_1 - x'_0} \times (x - x'_0) - \frac{vy_1 - vy_0}{x'_1 - x'_0} \times (y - y'_0) + vx_0 \\ vy = \frac{vy_1 - vy_0}{x'_1 - x'_0} \times (x - x'_0) + \frac{vx_1 - vx_0}{x'_1 - x'_0} \times (y - y'_0) + vy_0 \end{cases} \text{ or}$$

$$\begin{cases} vx = \frac{vx_1 - vx_0}{x'_1 - x'_0} \times (x - x'_0) - \frac{vx_2 - vx_0}{x'_2 - x'_0} \times (y - y'_0) + vx_0 \\ vy = \frac{vy_1 - vy_0}{x'_1 - x'_0} \times (x - x'_0) + \frac{vy_2 - vy_0}{y'_2 - y'_0} \times (y - y'_0) + vy_0 \end{cases} \text{ or}$$

$$\begin{cases} vx = \frac{vx_1 - vx_0}{x'_1 - x'_0} \times (x - x'_0) + \frac{vx_2 - vx_0}{y'_2 - y'_0} \times (y - y'_0) + \frac{(vx_3 + vx_0) - (vx_1 + vx_2)}{(x'_1 - x'_0) \times (y'_2 - y'_0)} \times (x - x'_0) \times (y - y'_0) + vx_0 \\ vy = \frac{vy_1 - vy_0}{x'_1 - x'_0} \times (x - x'_0) + \frac{vy_2 - vy_0}{y'_2 - y'_0} \times (y - y'_0) + \frac{(vy_3 + vy_0) - (vy_1 + vy_2)}{(x'_1 - x'_0) \times (y'_2 - y'_0)} \times (x - x'_0) \times (y - y'_0) + vy_0 \end{cases},$$

where the at least two feature points include the feature points whose coordinates are $(x_0',y_0')$ and $(x_1',y_1')$ in the reference block;

the at least two feature points include the feature points whose coordinates are $(x_0',y_0')$, $(x_1',y_1')$, and $(x_2',y_2')$ in the reference block; or the at least two feature points include the feature points whose coordinates are $(x_0',y_0')$, $(x_1',y_1')$, $(x_2',y_2')$, and $(x_3',y_3')$ in the reference block, where $vx_0$ is a horizontal motion vector of the feature point $(x_0',y_0')$, $vy_0$ is a vertical motion vector of the feature point $(x_0',y_0')$; $vx_1$ is a horizontal motion vector of the feature point $(x_1',y_1')$, $vy_1$ is a vertical motion vector of the feature point $(x_1',y_1')$, $vy_2$ is a vertical motion vector of the feature point $(x_2',y_2')$, $vx_2$ is a horizontal motion vector of the feature point $(x_2',y_2')$, $vy_3$ is a vertical motion vector of the feature point $(x_3',y_3')$, and $Vx_3$ is a horizontal motion vector of the feature point $(x_3',y_3')$; and vx is a horizontal motion vector of a subblock whose coordinates are (x,y) in the current block, and vy is a vertical motion vector of the subblock whose coordinates are (x,y) in the current block.

It should be noted that in this embodiment, an example in which derivation is performed mainly based on motion information of two, three, and four feature points is used for description, and other cases may be deduced by analogy.

S304: The video coding apparatus performs motion compensation prediction on each subblock in the current block based on the motion information of each subblock in the current block, to obtain a prediction block of the current block. In one embodiment, a predictor of each pixel in each subblock is obtained by using the motion information of each subblock in the current block, and motion compensation prediction is performed on the predictor of each pixel in each subblock in the current block, to obtain the prediction block of the current block.

305: The video coding apparatus obtains a prediction residual of the current block based on the prediction block of the current block. The video coding apparatus may write the prediction residual of the current picture block to a video bitstream.

As can be learned from the foregoing, in the solution in this embodiment, the video coding apparatus calculates the motion information of each subblock in the current block based on the location information and the motion information of the at least two feature points in the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used by the video coding apparatus to calculate the motion information of each subblock in the current block are matched at a relatively high degree. It is found in practice that this helps improve accuracy of calculating the motion information of each subblock in the current block, thereby improving precision of predicting the current block by using the reference block.

FIG. 4 is a schematic flowchart of another picture prediction method according to one embodiment. As shown in the example in FIG. 4, the other picture prediction method may include:

401: A video coding apparatus determines a reference block of a current block.

402: The video coding apparatus derives location information of at least two feature points in the reference block by using subblock division information of the reference block and location information of at least two control points used in an affine motion model used for the reference block.

For specific implementations of step 401 and step 402, refer to related descriptions of step 301 and step 302, and details are not described herein again.

403: The video coding apparatus calculates, based on the location information and motion information of the at least two feature points in the reference block, motion information of at least two control points used in an affine motion model used for the current block. Motion information of each subblock in the current block may be used as motion information of all pixels in the corresponding subblock. Location information of a central pixel of the subblock in the current block may be used as location information of the corresponding subblock.

For example, the motion information of the at least two control points used in the affine motion model used for the current block may be calculated with reference to the following formula and based on the location information and the motion information of the at least two feature points in the reference block:

$$\begin{cases} vx_4 = \frac{vx_1 - vx_0}{x'_1 - x'_0} \times (x_4 - x'_0) - \frac{vy_1 - vy_0}{x'_1 - x'_0} \times (y_4 - y'_0) + vx_0 \\ vy_4 = \frac{vy_1 - vy_0}{x'_1 - x'_0} \times (x_4 - x'_0) + \frac{vx_1 - vx_0}{x'_1 - x'_0} \times (y_4 - y'_0) + vy_0 \end{cases}$$

$$\begin{cases} vx_5 = \frac{vx_1 - vx_0}{x'_1 - x'_0} \times (x_5 - x'_0) + \frac{vy_1 - vy_0}{x'_1 - x'_0} \times (y_5 - y'_0) + vx_0 \\ vy_5 = \frac{vy_1 - vy_0}{x'_1 - x'_0} \times (x_5 - x'_0) + \frac{vx_1 - vx_0}{x'_1 - x'_0} \times (y_5 - y'_0) + vy_0 \end{cases} \text{ or }$$

$$\begin{cases} vx_4 = \frac{vx_1 - vx_0}{x'_1 - x'_0} \times (x_4 - x'_0) + \frac{vx_2 - vx_0}{x'_2 - x'_0} \times (y_4 - y'_0) + vx_0 \\ vy_4 = \frac{vy_1 - vy_0}{x'_1 - x'_0} \times (x_4 - x'_0) + \frac{vy_2 - vy_0}{y'_2 - y'_0} \times (y_4 - y'_0) + vy_0 \end{cases}$$

$$\begin{cases} vx_5 = \frac{vx_1 - vx_0}{x'_1 - x'_0} \times (x_5 - x'_0) + \frac{vx_2 - vx_0}{x'_2 - x'_0} \times (y_5 - y'_0) + vx_0 \\ vy_5 = \frac{vy_1 - vy_0}{x'_1 - x'_0} \times (x_5 - x'_0) + \frac{vy_2 - vy_0}{y'_2 - y'_0} \times (y_5 - y'_0) + vy_0 \end{cases}$$

$$\begin{cases} vx_6 = \frac{vx_1 - vx_0}{x'_1 - x'_0} \times (x_6 - x'_0) + \frac{vx_2 - vx_0}{x'_2 - x'_0} \times (y_6 - y'_0) + vx_0 \\ vy_6 = \frac{vy_1 - vy_0}{x'_1 - x'_0} \times (x_6 - x'_0) + \frac{vy_2 - vy_0}{y'_2 - y'_0} \times (y_6 - y'_0) + vy_0 \end{cases} \text{ or }$$

$$\begin{cases} vx_4 = \frac{vx_1 - vx_0}{x'_1 - x'_0} \times (x_4 - x'_0) + \frac{vx_2 - vx_0}{x'_2 - x'_0} \times (y_4 - y'_0) + \frac{(vx_3 + vx_0) - (vx_1 + vx_2)}{(x'_1 - x'_0) \times (y'_2 - y'_0)} \times (x_4 - x'_0) \times (y_4 - y'_0) + vx_0 \\ vy_4 = \frac{vy_1 - vy_0}{x'_1 - x'_0} \times (x_4 - x'_0) + \frac{vy_2 - vy_0}{y'_2 - y'_0} \times (y_4 - y'_0) + \frac{(vy_3 + vy_0) - (vy_1 + vy_2)}{(x'_1 - x'_0) \times (y'_2 - y'_0)} \times (x_4 - x'_0) \times (y_4 - y'_0) + vy_0 \end{cases}$$

$$\begin{cases} vx_5 = \frac{vx_1 - vx_0}{x'_1 - x'_0} \times (x_5 - x'_0) + \frac{vx_2 - vx_0}{x'_2 - x'_0} \times (y_5 - y'_0) + \frac{(vx_3 + vx_0) - (vx_1 + vx_2)}{(x'_1 - x'_0) \times (y'_2 - y'_0)} \times (x_5 - x'_0) \times (y_5 - y'_0) + vx_0 \\ vy_5 = \frac{vy_1 - vy_0}{x'_1 - x'_0} \times (x_5 - x'_0) + \frac{vy_2 - vy_0}{y'_2 - y'_0} \times (y_5 - y'_0) + \frac{(vy_3 + vy_0) - (vy_1 + vy_2)}{(x'_1 - x'_0) \times (y'_2 - y'_0)} \times (x_5 - x'_0) \times (y_5 - y'_0) + vy_0 \end{cases}$$

$$\begin{cases} vx_6 = \frac{vx_1 - vx_0}{x'_1 - x'_0} \times (x_6 - x'_0) + \frac{vx_2 - vx_0}{x'_2 - x'_0} \times (y_6 - y'_0) + \frac{(vx_3 + vx_0) - (vx_1 + vx_2)}{(x'_1 - x'_0) \times (y'_2 - y'_0)} \times (x_6 - x'_0) \times (y_6 - y'_0) + vx_0 \\ vy_6 = \frac{vy_1 - vy_0}{x'_1 - x'_0} \times (x_6 - x'_0) + \frac{vy_2 - vy_0}{y'_2 - y'_0} \times (y_6 - y'_0) + \frac{(vy_3 + vy_0) - (vy_1 + vy_2)}{(x'_1 - x'_0) \times (y'_2 - y'_0)} \times (x_6 - x'_0) \times (y_6 - y'_0) + vy_0 \end{cases}$$

$$\begin{cases} vx_7 = \frac{vx_1 - vx_0}{x'_1 - x'_0} \times (x_7 - x'_0) + \frac{vx_2 - vx_0}{x'_2 - x'_0} \times (y_7 - y'_0) + \frac{(vx_3 + vx_0) - (vx_1 + vx_2)}{(x'_1 - x'_0) \times (y'_2 - y'_0)} \times (x_7 - x'_0) \times (y_7 - y'_0) + vx_0 \\ vy_7 = \frac{vy_1 - vy_0}{x'_1 - x'_0} \times (x_7 - x'_0) + \frac{vy_2 - vy_0}{y'_2 - y'_0} \times (y_7 - y'_0) + \frac{(vy_3 + vy_0) - (vy_1 + vy_2)}{(x'_1 - x'_0) \times (y'_2 - y'_0)} \times (x_7 - x'_0) \times (y_7 - y'_0) + vy_0 \end{cases}$$

where the at least two feature points include the feature points whose coordinates are $(x_0',y_0')$ and $(x_1',y_1')$ in the reference block;

the at least two feature points include the feature points whose coordinates are $(x_0',y_0')$, $(x_1',y_1')$, and $(x_2',y_2')$ in the reference block; or the at least two feature points include the feature points whose coordinates are $(x_0',y_0')$, $(x_1',y_1')$, $(x_2',y_2')$, and $(x_3',y_3')$ in the reference block, where the at least two control points used in the affine motion model used for the current block include control points whose coordinates are respectively $(x_4,y_4)$ and $(x_5,y_5)$ in the current block, the at least two control points used in the affine motion model used for the current block include control points whose coordinates are respectively $(x_4,y_4)$, $(x_5,y_5)$, and $(x_6,y_6)$ in the current block; or the at least two control points used in the affine motion model used for the current block include control points whose coordinates are respectively $(x_4,y_4)$, $(x_5,y_5)$, $(x_6,y_6)$, and $(x_7,y_7)$ in the current block; and $vx_4$ is a horizontal motion vector of the control point $(x_4,y_4)$, $vy_4$ is a vertical motion vector of the control point $(x_4,y_4)$; $vx_5$ is a horizontal motion vector of the control point $(x_5,y_5)$, $vy_5$ is a vertical motion vector of the control point $(x_5,y_5)$, $vx_6$ is a horizontal motion vector of the control point $(x_6,y_6)$, $vy_6$ is a vertical motion vector of the control point $(x_6,y_6)$, $vx_7$ is a horizontal motion vector of the control point $(x_7,y_7)$, and $vy_7$ is a vertical motion vector of the control point $(x_7,y_7)$.

It should be noted that in this embodiment, an example in which derivation is performed mainly based on motion information of two, three, and four feature points is used for description, and other cases may be deduced by analogy.

404: The video coding apparatus calculates motion information of each subblock in the current block based on location information of each subblock in the current block and the motion information and location information of the at least two control points used in the affine motion model used for the current block.

For example, the motion information of each subblock in the current block may be calculated with reference to the following formula and based on the location information of each subblock in the current block and the motion information and the location information of the at least two control points used in the affine motion model used for the current block:

where vx is a horizontal motion vector of a subblock whose coordinates are (x,y) in the current block, and is a vertical motion vector of the subblock whose coordinates are (x,y) in the current block.

405: The video coding apparatus performs motion compensation prediction on each subblock in the current block based on the motion information of each subblock in the current block, to obtain a prediction block of the current block.

In one embodiment, a predictor of each pixel in each subblock is obtained by using the motion information of each subblock in the current block, and motion compensation prediction is performed on the predictor of each pixel in each subblock in the current block, to obtain the prediction block of the current block.

406: The video coding apparatus obtains a prediction residual of the current block based on the prediction block of the current block. The video coding apparatus may write the prediction residual of the current picture block to a video bitstream.

As can be learned from the foregoing, in the solution in this embodiment, the video coding apparatus calculates the motion information of the at least two control points used in the affine motion model used for the current block based on the location information and the motion information of the at least two feature points in the current block, and calculates the motion information of each subblock in the current block based on the motion information of the at least two control points used in the affine motion model used for the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used by the video coding apparatus to calculate the motion information of each subblock in the current block may be matched at a relatively high degree. It is found in practice that this helps improve accuracy of calculating the motion information of each subblock in the current block, thereby improving precision of predicting the current block by using the reference block.

$$\begin{cases} vx = \dfrac{vx_5 - vx_4}{x_5 - x_4} \times (x - x_4) - \dfrac{vy_5 - vy_4}{x_5 - x_4} \times (y - y_4) + vx_4 \\ vy = \dfrac{vy_5 - vy_4}{x_5 - x_4} \times (x - x_4) + \dfrac{vx_1 - vx_0}{x_5 - x_4} \times (y - y_4) + vy_4 \end{cases} \text{or}$$

$$\begin{cases} vx = \dfrac{vx_5 - vx_4}{x_5 - x_4} \times (x - x_4) + \dfrac{vx_6 - vx_4}{x_6 - x_4} \times (y - y_4) + vx_4 \\ vy = \dfrac{vy_5 - vy_4}{x_5 - x_4} \times (x - x_4) + \dfrac{vy_6 - vy_4}{x_6 - x_4} \times (y - y_4) + vy_4 \end{cases} \text{or}$$

$$\begin{cases} vx = \dfrac{vx_5 - vx_4}{x_5 - x_4} \times (x - x_4) + \dfrac{vx_6 - vx_7}{y_6 - y_4} \times (y - y_4) + \dfrac{(vx_7 + vx_4) - (vx_5 + vx_6)}{(x_5 - x_4) \times (y_6 - y_4)} \times (x - x_4) \times (y - y_4) + vx_4 \\ vy = \dfrac{vy_5 - vy_4}{x_5 - x_4} \times (x - x_4) + \dfrac{vy_6 - vy_7}{y_6 - y_4} \times (y - y_4) + \dfrac{(vy_7 + vy_4) - (vy_5 + vy_6)}{(x_5 - x_4) \times (y_6 - y_4)} \times (x - x_4) \times (y - y_4) + vy_4 \end{cases},$$

Figure 5:
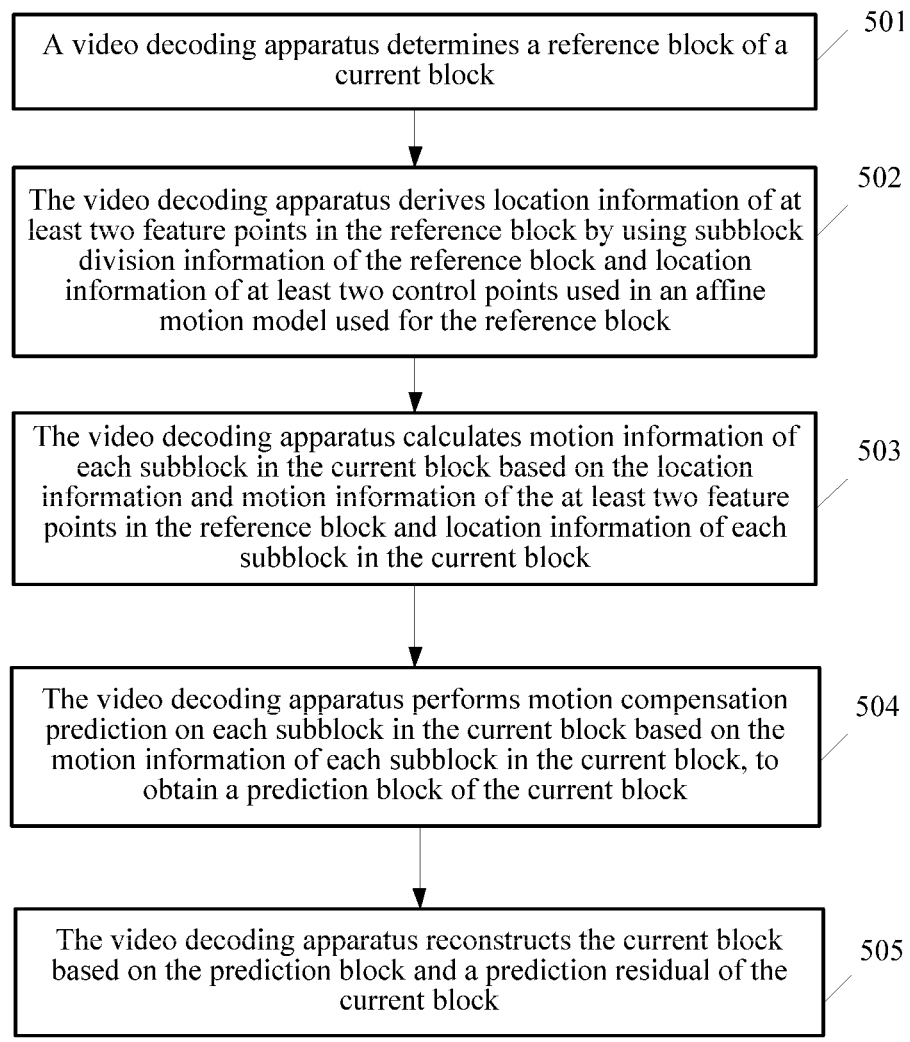
FIG. 5 is a schematic flowchart of another picture prediction method according to one embodiment.

FIG. 5 is a schematic flowchart of another picture prediction method according to one embodiment. As shown in the example in FIG. 5, the other picture prediction method may include:

501: A video decoding apparatus determines a reference block of a current block.

The reference block is spatially adjacent to the current block, and the reference block is predicted by using an affine motion model.

502: The video decoding apparatus derives location information of at least two feature points in the reference block by using subblock division information of the reference block and location information of at least two control points used in an affine motion model used for the reference block.

The at least two feature points are located in subblocks in which the at least two control points in the reference block are located, and motion information of the feature point is used as motion information of the subblock in which the feature point is located.

It should be noted that an encoder side and a decoder side may perform subblock division on the reference block in a same subblock division manner. For example, the reference block may be fixedly divided into 4*4 or 8*8 subblocks. Certainly, a corresponding subblock division manner may alternatively be derived by using size information of the reference block, vertex motion information, and the like. This is not limited herein.

503: The video decoding apparatus calculates motion information of each subblock in the current block based on the location information and motion information of the at least two feature points in the reference block and location information of each subblock in the current block.

Motion information of each subblock in the current block may be used as motion information of all pixels in the corresponding subblock. Location information of a central pixel of the subblock in the current block may be used as location information of the corresponding subblock.

504: The video decoding apparatus performs motion compensation prediction on each subblock in the current block based on the motion information of each subblock in the current block, to obtain a prediction block of the current block.

In one embodiment, a predictor of each pixel in each subblock is obtained by using the motion information of each subblock in the current block, and motion compensation prediction is performed on the predictor of each pixel in each subblock in the current block, to obtain the prediction block of the current block.

For specific implementations of step 501 to step 504, refer to related descriptions of step 301 to step 304, and details are not described herein again.

505: The video decoding apparatus reconstructs the current block based on the prediction block of the current block and a corresponding prediction residual in a video bitstream.

As can be learned from the foregoing, in the solution in this embodiment, the video decoding apparatus calculates the motion information of each subblock in the current block based on the location information and the motion information of the at least two feature points in the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used by the video decoding apparatus to calculate the motion information of each subblock in the current block are matched at a relatively high degree. It is found in practice that this helps improve accuracy of calculating the motion information of each subblock in the current block, thereby improving precision of predicting the current block by using the reference block.

Figure 6:
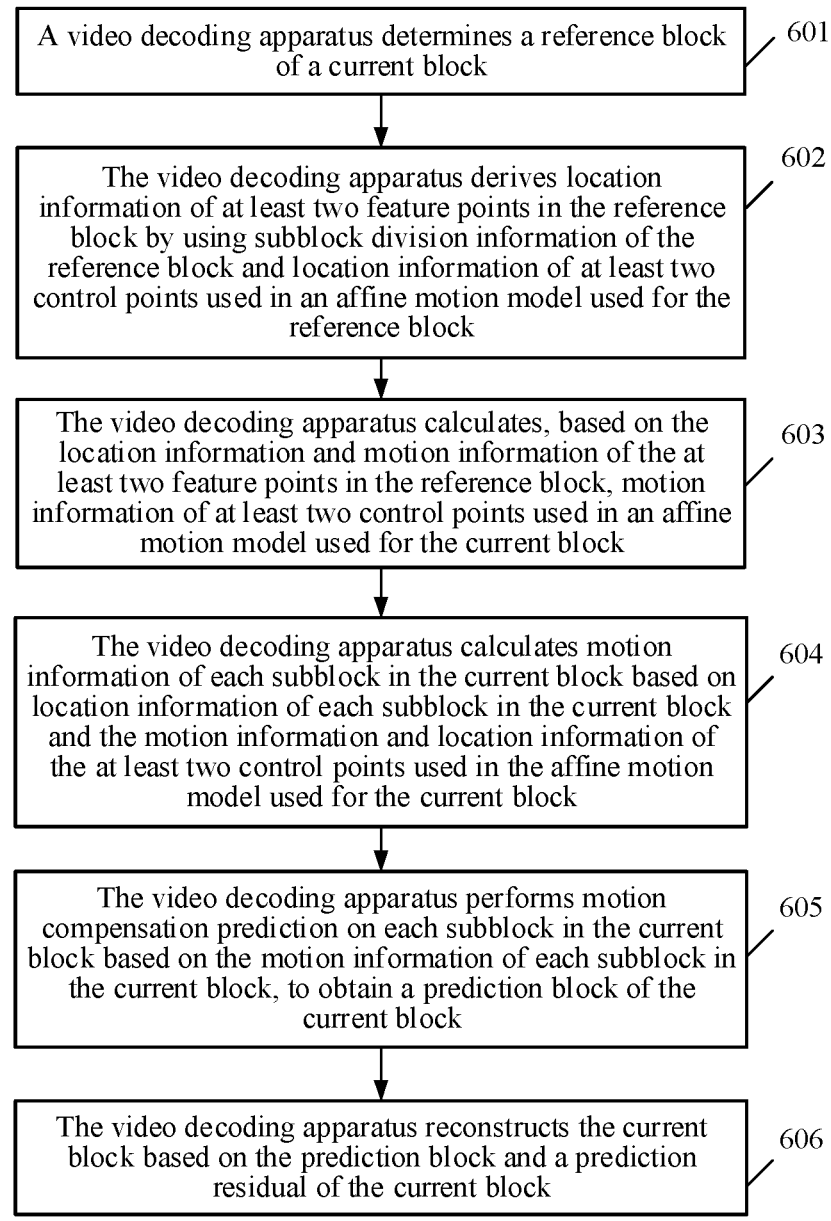
FIG. 6 is a schematic flowchart of another picture prediction method according to one embodiment.

FIG. 6 is a schematic flowchart of another picture prediction method according to one embodiment. As shown in the example in FIG. 6, the other picture prediction method may include:

601: A video decoding apparatus determines a reference block of a current block. The reference block is spatially adjacent to the current block, and the reference block is predicted by using an affine motion model.

602: The video decoding apparatus derives location information of at least two feature points in the reference block by using subblock division information of the reference block and location information of at least two control points used in the affine motion model used for the reference block.

603: The video decoding apparatus calculates, based on the location information and motion information of the at least two feature points in the reference block, motion information of at least two control points used in an affine motion model used for the current block.

Motion information of each subblock in the current block may be used as motion information of all pixels in the corresponding subblock. Location information of a central pixel of the subblock in the current block may be used as location information of the corresponding subblock.

604: The video decoding apparatus calculates motion information of each subblock in the current block based on location information of each subblock in the current block and the motion information and location information of the at least two control points used in the affine motion model used for the current block.

For specific implementations of step 601 to step 604, refer to related descriptions of step 401 and step 404, and details are not described herein again.

605: The video decoding apparatus performs motion compensation prediction on each subblock in the current block based on the motion information of each subblock in the current block, to obtain a prediction block of the current block.

In one embodiment, a predictor of each pixel in each subblock is obtained by using the motion information of each subblock in the current block, and motion compensation prediction is performed on the predictor of each pixel in each subblock in the current block, to obtain the prediction block of the current block.

606: The video decoding apparatus reconstructs the current block based on the prediction block of the current block and a corresponding prediction residual in a video bitstream.

As can be learned from the foregoing, in the solution in this embodiment, the video decoding apparatus calculates the motion information of the at least two control points used in the affine motion model used for the current block based on the location information and the motion information of the at least two feature points in the current block, and calculates the motion information of each subblock in the current block based on the motion information of the at least two control points used in the affine motion model used for the current block. In addition, the at least two feature points are located in the subblocks in which the at least two control points in the reference block are located, the at least two control points are the control points used in the affine motion model used to predict the reference block, and the motion information of the subblock in which the feature point is located is obtained based on the motion information of the corresponding feature point. Therefore, the location information and the motion information of the feature point in the reference block that are used by the video decoding apparatus to calculate the motion information of each subblock in the current block is matched at a relatively high degree. It is found in practice that this helps improve accuracy of calculating the motion information of each subblock in the current block, thereby improving precision of predicting the current block by using the reference block.

The following further provides a related apparatus configured to implement the foregoing solution.

Referring to FIG. 7, in one embodiment, a picture prediction apparatus is provided. The apparatus includes:

a determining unit 710 configured to determine a reference block of a current block, where the reference block and the current block are spatially adjacent, and the reference block is predicted by using an affine motion model;

an obtaining unit 720 configured to obtain location information and motion information of at least two feature points in the reference block, where the at least two feature points are located in subblocks in which at least two control points in the reference block are located, the at least two control points are control points used in the affine motion model used to predict the reference block, and motion information of the subblock in which the feature point is located is obtained based on motion information of the corresponding feature point;

a calculation unit 730 configured to calculate motion information of each subblock in the current block based on the location information and the motion information of the at least two feature points in the reference block; and a prediction unit 740 configured to perform motion compensation prediction on each subblock in the current block based on the motion information of each subblock in the current block, to obtain a prediction block of the current block.

In some embodiments, the feature point is in a central location of the subblock in which the control point in the reference block is located.

In some embodiments, the location information of the feature point in the reference block is obtained by offsetting location information of the control point in the reference block in the following manner:

(x',y')=(x+a,y+b), where (x,y) are coordinates of a control point in the reference block, (x',y') are coordinates of a feature point in a subblock in which the control point whose coordinates are (x,y) in the reference block is located, a is a horizontal offset, b is a vertical offset, and a and b are not equal to 0.

In some embodiments, the at least two control points in the reference block include at least two of an upper left vertex, an upper right vertex, a lower left vertex, and a lower right vertex of the reference block, and when location coordinates of the upper left vertex of the reference block are $(x_0,y_0)$ a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases},$$

where $(x_1,y_1)$ are coordinates of the upper right vertex of the reference block, $(x_2,y_2)$ are coordinates of the lower left vertex of the reference block, and $(x_3,y_3)$ are coordinates of the lower right vertex of the reference block.

In some embodiments, the at least two feature points include feature points whose coordinates are respectively $(x_0',y_0')$ and $(x_1',y_1')$ in the reference block, where $$\begin{cases} (x_0', y_0') = (x_0 + N_1/2, y_0 + N_2/2) \\ (x_1', y_1') = (x_1 - N_1/2, y_1 + N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_1 + N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, and w is a width of the reference block.

In some embodiments, the at least two feature points include feature points whose coordinates are respectively $(x_0',y_0')$, $(x_1',y_1')$, and $(x_2',y_2')$ in the reference block, where $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, w is a width of the reference block, and h is a height of the reference block.

In some embodiments, the at least two feature points include feature points whose coordinates are respectively $(x_0',y_0')$, $(x_1',y_1')$, $(x_2',y_2')$, and $(x_3',y_3')$ in the reference block, where $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \\ (x_3', y_3') = (x_3 - N_1/2, y_3 - N_2/2) \end{cases} \text{or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \\ (x_3', y_3') = (x_0 + w - N_1/2, y_0 + h - N_2/2) \end{cases},$$

where $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, $(x_3,y_3)$ are coordinates of a control point in a subblock in which the feature point $(x_3',y_3')$ in the reference block is located, w is a width of the reference block, and h is a height of the reference block.

In some embodiments, the calculation unit is configured to calculate the motion information of each subblock in the current block based on the location information and the motion information of the at least two feature points in the reference block and location information of each subblock in the current block.

In some embodiments, the calculation unit is configured to calculate the motion information of each subblock in the current block with reference to the following formula and based on the location information and the motion information of the at least two feature points in the reference block and the location information of each subblock in the current block:

$$\begin{cases} vx = \dfrac{vx_1 - vx_0}{x_1' - x_0'} \times (x - x_0') - \dfrac{vy_1 - vy_0}{x_1' - x_0'} \times (y - y_0') + vx_0 \\ vy = \dfrac{vy_1 - vy_0}{x_1' - x_0'} \times (x - x_0') + \dfrac{vx_1 - vx_0}{x_1' - x_0'} \times (y - y_0') + vy_0 \end{cases} \text{ or }$$

$$\begin{cases} vx = \dfrac{vx_1 - vx_0}{x_1' - x_0'} \times (x - x_0') - \dfrac{vx_2 - vx_0}{x_2' - x_0'} \times (y - y_0') + vx_0 \\ vy = \dfrac{vy_1 - vy_0}{x_1' - x_0'} \times (x - x_0') + \dfrac{vy_2 - vy_0}{y_2' - y_0'} \times (y - y_0') + vy_0 \end{cases} \text{ or }$$

$$\begin{cases} vx = \dfrac{vx_1 - vx_0}{x_1' - x_0'} \times (x - x_0') + \dfrac{vx_2 - vx_0}{y_2' - y_0'} \times (y - y_0') + \dfrac{(vx_3 + vx_0) - (vx_1 + vx_2)}{(x_1' - x_0') \times (y_2' - y_0')} \times (x - x_0') \times (y - y_0') + vx_0 \\ vy = \dfrac{vy_1 - vy_0}{x_1' - x_0'} \times (x - x_0') + \dfrac{vy_2 - vy_0}{y_2' - y_0'} \times (y - y_0') + \dfrac{(vy_3 + vy_0) - (vy_1 + vy_2)}{(x_1' - x_0') \times (y_2' - y_0')} \times (x - x_0') \times (y - y_0') + vy_0 \end{cases},$$

the at least two feature points include the feature points whose coordinates are $(x_0',y_0')$ and $(x_1',y_1')$ in the reference block;

the at least two feature points include the feature points whose coordinates are $(x_0',y_0')$ $(x_1',y_1')$, and $(x_2',y_2')$ in the reference block; or the at least two feature points include the feature points whose coordinates are $(x_0',y_0')$ $(x_1',y_1')$, $(x_2',y_2')$, and $(x_3',y_3')$ in the reference block, where $vx_0$ is a horizontal motion vector of the feature point $(x_0',y_0')$, $vy_0$ is a vertical motion vector of the feature point $(x_0',y_0')$; $vx_1$ is a horizontal motion vector of the feature point $(x_1',y_1')$, $vy_1$ is a vertical motion vector of the feature point $(x_1',y_1')$, $vy_2$ is a vertical motion vector of the feature point $(x_2',y_2')$, $vx_2$ is a horizontal motion vector of the feature point $(x_2',y_2')$, $vy_3$ is a vertical motion vector of the feature point $(x_3',y_3')$, and $vx_3$ is a horizontal motion vector of the feature point $(x_3',y_3')$; and vx is a horizontal motion vector of a subblock whose coordinates are (x,y) in the current block, and vy is a vertical motion vector of the subblock whose coordinates are (x,y) in the current block.

In some embodiments, the calculation unit is configured to: calculate, based on the location information and the motion information of the at least two feature points in the reference block, motion information of at least two control points used in an affine motion model used for the current block; and calculate the motion information of each subblock in the current block based on location information of each subblock in the current block and the motion information and location information of the at least two control points used in the affine motion model used for the current block.

In some embodiments, when calculating, based on the location information and the motion information of the at least two feature points in the reference block, the motion information of the at least two control points used in the affine motion model used for the current block, the calculation unit is configured to calculate, with reference to the following formula and based on the location information and the motion information of the at least two feature points in the reference block, the motion information of the at least two control points used in the affine motion model used for the current block:

$$\begin{cases} vx_4 = \dfrac{vx_1 - vx_0}{x_1' - x_0'} \times (x_4 - x_0') - \dfrac{vy_1 - vy_0}{x_1' - x_0'} \times (y_4 - y_0') + vx_0 \\ vy_4 = \dfrac{vy_1 - vy_0}{x_1' - x_0'} \times (x_4 - x_0') + \dfrac{vx_1 - vx_0}{x_1' - x_0'} \times (y_4 - y_0') + vy_0 \end{cases}$$

$$\begin{cases} vx_5 = \dfrac{vx_1 - vx_0}{x_1' - x_0'} \times (x_5 - x_0') + \dfrac{vy_1 - vy_0}{x_1' - x_0'} \times (y_5 - y_0') + vx_0 \\ vy_5 = \dfrac{vy_1 - vy_0}{x_1' - x_0'} \times (x_5 - x_0') + \dfrac{vx_1 - vx_0}{x_1' - x_0'} \times (y_5 - y_0') + vy_0 \end{cases} \text{ or}$$

$$\begin{cases} vx_4 = \dfrac{vx_1 - vx_0}{x_1' - x_0'} \times (x_4 - x_0') + \dfrac{vx_2 - vx_0}{x_2' - x_0'} \times (y_4 - y_0') + vx_0 \\ vy_4 = \dfrac{vy_1 - vy_0}{x_1' - x_0'} \times (x_4 - x_0') + \dfrac{vy_2 - vy_0}{y_2' - y_0'} \times (y_4 - y_0') + vy_0 \end{cases}$$

$$\begin{cases} vx_5 = \dfrac{vx_1 - vx_0}{x_1' - x_0'} \times (x_5 - x_0') + \dfrac{vx_2 - vx_0}{x_2' - x_0'} \times (y_5 - y_0') + vx_0 \\ vy_5 = \dfrac{vy_1 - vy_0}{x_1' - x_0'} \times (x_5 - x_0') + \dfrac{vy_2 - vy_0}{y_2' - y_0'} \times (y_5 - y_0') + vy_0 \end{cases}$$

$$\begin{cases} vx_6 = \dfrac{vx_1 - vx_0}{x_1' - x_0'} \times (x_6 - x_0') + \dfrac{vx_2 - vx_0}{x_2' - x_0'} \times (y_6 - y_0') + vx_0 \\ vy_6 = \dfrac{vy_1 - vy_0}{x_1' - x_0'} \times (x_6 - x_0') + \dfrac{vy_2 - vy_0}{y_2' - y_0'} \times (y_6 - y_0') + vy_0 \end{cases} \text{ or}$$

$$\begin{cases} vx_4 = \dfrac{vx_1 - vx_0}{x_1' - x_0'} \times (x_4 - x_0') + \dfrac{vx_2 - vx_0}{x_2' - x_0'} \times (y_4 - y_0') + \dfrac{(vx_3 + vx_0) - (vx_1 + vx_2)}{(x_1' - x_0') \times (y_2' - y_0')} \times (x_4 - x_0') \times (y_4 - y_0') + vx_0 \\ vy_4 = \dfrac{vy_1 - vy_0}{x_1' - x_0'} \times (x_4 - x_0') + \dfrac{vy_2 - vy_0}{y_2' - y_0'} \times (y_4 - y_0') + \dfrac{(vy_3 + vy_0) - (vy_1 + vy_2)}{(x_1' - x_0') \times (y_2' - y_0')} \times (x_4 - x_0') \times (y_4 - y_0') + vy_0 \end{cases}$$

$$\begin{cases} vx_5 = \dfrac{vx_1 - vx_0}{x_1' - x_0'} \times (x_5 - x_0') + \dfrac{vx_2 - vx_0}{x_2' - x_0'} \times (y_5 - y_0') + \dfrac{(vx_3 + vx_0) - (vx_1 + vx_2)}{(x_1' - x_0') \times (y_2' - y_0')} \times (x_5 - x_0') \times (y_5 - y_0') + vx_0 \\ vy_5 = \dfrac{vy_1 - vy_0}{x_1' - x_0'} \times (x_5 - x_0') + \dfrac{vy_2 - vy_0}{y_2' - y_0'} \times (y_5 - y_0') + \dfrac{(vy_3 + vy_0) - (vy_1 + vy_2)}{(x_1' - x_0') \times (y_2' - y_0')} \times (x_5 - x_0') \times (y_5 - y_0') + vy_0 \end{cases}$$

$$\begin{cases} vx_6 = \dfrac{vx_1 - vx_0}{x_1' - x_0'} \times (x_6 - x_0') + \dfrac{vx_2 - vx_0}{x_2' - x_0'} \times (y_6 - y_0') + \dfrac{(vx_3 + vx_0) - (vx_1 + vx_2)}{(x_1' - x_0') \times (y_2' - y_0')} \times (x_6 - x_0') \times (y_6 - y_0') + vx_0 \\ vy_6 = \dfrac{vy_1 - vy_0}{x_1' - x_0'} \times (x_6 - x_0') + \dfrac{vy_2 - vy_0}{y_2' - y_0'} \times (y_6 - y_0') + \dfrac{(vy_3 + vy_0) - (vy_1 + vy_2)}{(x_1' - x_0') \times (y_2' - y_0')} \times (x_6 - x_0') \times (y_6 - y_0') + vy_0 \end{cases}$$

$$\begin{cases} vx_7 = \dfrac{vx_1 - vx_0}{x_1' - x_0'} \times (x_7 - x_0') + \dfrac{vx_2 - vx_0}{x_2' - x_0'} \times (y_7 - y_0') + \dfrac{(vx_3 + vx_0) - (vx_1 + vx_2)}{(x_1' - x_0') \times (y_2' - y_0')} \times (x_7 - x_0') \times (y_7 - y_0') + vx_0 \\ vy_7 = \dfrac{vy_1 - vy_0}{x_1' - x_0'} \times (x_7 - x_0') + \dfrac{vy_2 - vy_0}{y_2' - y_0'} \times (y_7 - y_0') + \dfrac{(vy_3 + vy_0) - (vy_1 + vy_2)}{(x_1' - x_0') \times (y_2' - y_0')} \times (x_7 - x_0') \times (y_7 - y_0') + vy_0 \end{cases},$$

where the at least two feature points include the feature points whose coordinates are $(x_0',y_0')$ and $(x_1',y_1')$ in the reference block;

the at least two feature points include the feature points whose coordinates are $(x_0',y_0')$, $(x_1',y_1')$, and $(x_2',y_2')$ in the reference block; or the at least two feature points include the feature points whose coordinates are $(x_0',y_0')$, $(x_1',y_1')$, $(x_2',y_2')$, and $(x_3',y_3')$ in the reference block, where the at least two control points used in the affine motion model used for the current block include control points whose coordinates are respectively $(x_4,y_4)$ and $(x_5,y_5)$ in the current block; the at least two control points used in the affine motion model used for the current block include control points whose coordinates are respectively $(x_4,y_4)$, $(x_5,y_5)$, and $(x_6,y_6)$ in the current block; or the at least two control points used in the affine motion model used for the current block include control points whose coordinates are respectively $(x_4,y_4)$, $(x_5,y_5)$, $(x_6,y_6)$, and $(x_7,y_7)$ in the current block; and $vx_4$ is a horizontal motion vector of the control point $(x_4,y_4)$, $vy_4$ is a vertical motion vector of the control point $(x_4,y_4)$; $vx_5$ is a horizontal motion vector of the control point $(x_5,y_5)$ $vy_5$ is a vertical motion vector of the control point $(x_5,y_5)$, $vx_6$ is a horizontal motion vector of the control point $(x_6,y_6)$, $vy_6$ is a vertical motion vector of the control point $(x_6,y_6)$, $vx_7$ is a horizontal motion vector of the control point $(x_7,y_7)$, and $vy_7$ is a vertical motion vector of the control point $(x_7,y_7)$.

In some embodiments, when calculating the motion information of each subblock in the current block based on the location information of each subblock in the current block and the motion information and the location information of the at least two control points used in the affine motion model used for the current block, the calculation unit is configured to calculate the motion information of each subblock in the current block with reference to the following formula and based on the location information of each subblock in the current block and the motion information and the location information of the at least two control points used in the affine motion model used for the current block:

$$\begin{cases} vx = \dfrac{vx_5 - vx_4}{x_5 - x_4} \times (x - x_4) - \dfrac{vy_5 - vy_4}{x_5 - x_4} \times (y - y_4) + vx_4 \\ vy = \dfrac{vy_5 - vy_4}{x_5 - x_4} \times (x - x_4) + \dfrac{vx_1 - vx_0}{x_5 - x_4} \times (y - y_4) + vy_4 \end{cases} \text{ or}$$

$$\begin{cases} vx = \dfrac{vx_5 - vx_4}{x_5 - x_4} \times (x - x_4) + \dfrac{vx_6 - vx_4}{x_6 - x_4} \times (y - y_4) + vx_4 \\ vy = \dfrac{vy_5 - vy_4}{x_5 - x_4} \times (x - x_4) + \dfrac{vy_6 - vy_4}{x_6 - x_4} \times (y - y_4) + vy_4 \end{cases} \text{ or}$$

$$\begin{cases} vx = \dfrac{vx_5 - vx_4}{x_5 - x_4} \times (x - x_4) + \dfrac{vx_6 - vx_4}{y_6 - y_4} \times (y - y_4) + \dfrac{(vx_7 + vx_4) - (vx_5 + vx_6)}{(x_5 - x_4) \times (y_6 - y_4)} \times (x - x_4) \times (y - y_4) + vx_4 \\ vy = \dfrac{vy_5 - vy_4}{x_5 - x_4} \times (x - x_4) + \dfrac{vy_6 - vy_4}{y_6 - y_4} \times (y - y_4) + \dfrac{(vy_7 + vy_4) - (vy_5 + vy_6)}{(x_5 - x_4) \times (y_6 - y_4)} \times (x - x_4) \times (y - y_4) + vy_4 \end{cases},$$

where vx is a horizontal motion vector of a subblock whose coordinates are (x,y) in the current block, and vy is a vertical motion vector of the subblock whose coordinates are (x,y) in the current block.

The picture prediction apparatus 700 may be applied to a video coding apparatus or a video decoding apparatus.

Referring to FIG. 8, in one embodiment, a picture prediction apparatus 800 is provided. The apparatus 800 may include: a storage component 810 and a processor 830 coupled to the storage component. The storage component 810 is configured to store an instruction, and the processor 830 is configured to execute the instruction. When executing the instruction, the processor 830 may perform, according to the instruction, steps performed by the picture prediction apparatus in any method in the foregoing embodiments of this application.

The processor 830 may also be referred to as a central processing unit (CPU). The storage component 810 may include a read-only memory and a random access memory, and provide an instruction and data to the processor 830. A part of the storage component 810 may further include a non-volatile random access memory. In one embodiment, components of the picture prediction apparatus 800 are coupled by using, for example, a bus system. The bus system may further include a power bus, a control bus, a status signal bus, and the like, in addition to a data bus. However, for clear description, various types of buses in the figure are marked as the bus system 840. The methods disclosed in the foregoing embodiments may be applied to the processor 830, or are implemented by the processor 830. The processor 830 may be an integrated circuit chip and has a signal processing capability.

In one embodiment, steps in the foregoing methods can be implemented by using a hardware integrated logical circuit in the processor 830, or by using instructions in a form of software. The processor 830 may be a general purpose processor, a digital signal processor, an application-specific integrated circuit, a field programmable gate array or another programmable logic device, a discrete gate or a transistor logic device, or a discrete hardware component. The processor 830 may implement or execute methods, steps and logical block diagrams in the method embodiments of the present disclosure. The general purpose processor may be a microprocessor, or the processor may be any conventional processor or the like. Steps of the methods disclosed with reference to the embodiments of the present disclosure may be directly performed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the storage component 810, for example the processor 830 reads information in the storage component 810 and completes the steps in the foregoing methods in combination with hardware of the processor.

For example, the picture prediction apparatus 800 may perform the steps in the methods corresponding to the embodiments shown in FIG. 2 to FIG. 6.

The picture prediction apparatus provided in this embodiment of this application is applied to a video coding apparatus or a video decoding apparatus. The video coding apparatus or the video decoding apparatus may be any apparatus that needs to output or store a video, for example, a device such as a notebook computer, a tablet computer, a personal computer, a mobile phone, or a video server.

In addition, an embodiment of this application further provides a computer-readable storage medium. The computer-readable storage medium stores program code. The program code includes an instruction used to perform some or all steps in any picture prediction method according to the embodiments of the present disclosure.

An embodiment of this application further provides a computer program product. When the computer program product runs on a computer, the computer is enabled to perform some or all steps in the methods in the foregoing method embodiments.

An embodiment of this application further provides an application release platform. The application release platform is used to release a computer program product, and when the computer program product runs on a computer, the computer is enabled to perform some or all steps in the methods in the foregoing method embodiments.

FIG. 9-A is a schematic block diagram of a video encoder 20 to which an embodiment of this application may be applied. The video encoder 20 includes an encoder side prediction module 201, a transformation and quantization module 202, an entropy encoding module 203, an encoding reconstruction module 204, and an encoder side filtering module 205. FIG. 9-B is a schematic block diagram of a video decoder 30 to which an embodiment of this application may be applied. The video decoder 30 includes a decoder side prediction module 206, an inverse-transformation and dequantization module 207, an entropy decoding module 208, a decoding reconstruction module 209, and a decoder side filtering module 210.

The video encoder 20 may be configured to perform the picture prediction method or a video coding method in the embodiments of this application. The video encoder 30 may be configured to perform the picture prediction method or a video decoding method in the embodiments of this application. Details are as follows:

The encoder side prediction module 201 and the decoder side prediction module 206 are configured to generate prediction data. The video encoder 20 may generate CUs that can no longer be divided and that include one or more prediction units (PUs). Each PU of the CU may be associated with different pixel blocks in a pixel block of the CU. The video encoder 20 may generate a predictive pixel block for each PU of the CU. The video encoder 20 may generate the predictive pixel block of the PU by means of intra-frame prediction or inter-frame prediction. If the video encoder 20 generates the predictive pixel block of the PU by means of intra-frame prediction, the video encoder 20 may generate the predictive pixel block of the PU based on a decoded pixel of a picture associated with the PU. If the video encoder 20 generates the predictive pixel block of the PU by means of inter-frame prediction, the video encoder 20 may generate the predictive pixel block of the PU based on a decoded pixel of one or more pictures different from a picture associated with the PU. The video encoder 20 may generate a residual pixel block of the CU based on the predictive pixel block of the PU of the CU. The residual pixel block of the CU may indicate a difference between a sample value in the predictive pixel block of the PU of the CU and a corresponding sample value in an initial pixel block of the CU.

The transformation and quantization module 202 is configured to process residual data obtained through prediction. The video encoder 20 may perform recursive quadtree partitioning on the residual pixel block of the CU, to partition the residual pixel block of the CU into one or more smaller residual pixel blocks associated with a transform unit (TU) of the CU. Each pixel in a pixel block associated with the TU corresponds to one luminance sample and two chrominance samples. Therefore, each TU may be associated with one luminance residual sample block and two chrominance residual sample blocks. The video encoder 20 may apply one or more transformations to a residual sample block associated with the TU to generate a coefficient block (that is, a block of a coefficient). The transformation may be a DCT transformation or a variant thereof. A two-dimensional transformation is calculated by using a DCT transformation matrix and by applying a one-dimensional transformation in horizontal and vertical directions, to obtain the coefficient block. The video encoder 20 may perform a quantization procedure on each coefficient in the coefficient block. Quantization usually refers to a process in which a coefficient is quantized to reduce a data volume used to indicate the coefficient, for further compression. The inverse-transformation and dequantization module 207 performs an inverse process of the transformation and quantization module 202.

The video encoder 20 may generate a set of syntactic elements indicating the coefficient in the coefficient block after the quantization. The video encoder 20 may apply, by using the entropy encoding module 203, an entropy encoding operation (for example, a context-adaptive binary arithmetic coding (CABAC) operation) to some or all of the foregoing syntactic elements. To apply CABAC coding to the syntactic elements, the video encoder 20 may binarize the syntactic elements to form a binary sequence including one or more bits (referred to as "binary bits"). The video encoder 20 may encode some of the binary bits by means of regular (regular) encoding, and may encode other binary bits by means of bypass encoding.

In addition to performing entropy encoding on the syntactic elements of the coefficient block, the video encoder 20 may apply, by using the encoding reconstruction module 204, inverse quantization and an inverse transformation to a transformed coefficient block, to reconstruct a residual sample block by using the transformed coefficient block. The video encoder 20 may add the reconstructed residual sample block to a sample block corresponding to one or more predictive sample blocks, to generate a reconstructed sample block. By reconstructing a sample block of each color component, the video encoder 20 may reconstruct the pixel block associated with the TU. A pixel block of each TU of the CU is reconstructed in such a manner until an entire pixel block of the CU is reconstructed.

After reconstructing the pixel block of the CU, the video encoder 20 performs a deblocking filtering operation by using the encoder side filtering module 205, to reduce a block effect of the pixel block associated with the CU. After performing the deblocking filtering operation, the video encoder 20 may use a sample adaptive offset (SAO) to modify a reconstructed pixel block of the CTB of the picture. After performing these operations, the video encoder 20 may store the reconstructed pixel block of the CU in a decoded picture buffer for generating a predictive pixel block of another CU.

The video decoder 30 may receive a bitstream. The bitstream includes, in the form of a bit stream, encoding information of video data encoded by the video encoder 20. The video decoder 30 parses the bitstream by using the entropy decoding module 208 to extract a syntactic element from the bitstream. When performing CABAC decoding, the video decoder 30 may perform regular decoding on some binary bits and may perform bypass decoding on other binary bits. Binary bits in the bitstream have a mapping relationship with the syntactic element, and the syntactic element is obtained by parsing the binary bits.

The video decoder 30 may reconstruct a picture of the video data based on the syntactic element extracted from the bitstream and by using the decoding reconstruction module 209. A process of reconstructing the video data based on the syntactic element is basically inverse to a process performed by the video encoder 20 to generate the syntactic element. For example, the video decoder 30 may generate, based on a syntactic element associated with a CU, a predictive pixel block of a PU of the CU. In addition, the video decoder 30 may perform inverse quantization on a coefficient block associated with a TU of the CU. The video decoder 30 may perform an inverse transformation on the coefficient block on which the inverse quantization has been performed, to reconstruct a residual pixel block associated with the TU of the CU. The video decoder 30 may reconstruct a pixel block of the CU based on the predictive pixel block and the residual pixel block.

Figure 11:
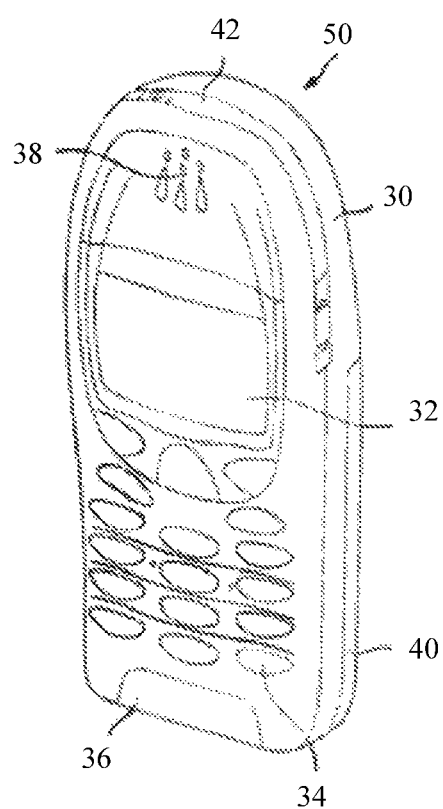
FIG. 11 is another schematic block diagram of an electronic apparatus according to one embodiment.

After reconstructing the pixel block of the CU, the video decoder 30 performs a deblocking filtering operation by using the decoding filtering module 210, to reduce a block effect of the pixel block associated with the CU. In addition, the video decoder 30 may perform, based on one or more SAO syntactic elements, a same SAO operation as that of the video encoder 20. After performing these operations, the video decoder 30 may store the pixel block of the CU in the decoded picture buffer. The decoded picture buffer may provide a reference picture used for subsequent motion compensation, intra-frame prediction, and presentation by a display apparatus. FIG. 10 and FIG. 11 are two schematic block diagrams of an electronic apparatus 50, where the electronic apparatus 50 may be integrated to a codec to which this embodiment of this application may be applied. FIG. 11 is a schematic diagram for video coding apparatus according to an embodiment of this application. The following describes the units in FIG. 10 and FIG. 11.

The electronic apparatus 50 may be, for example, a mobile terminal or user equipment in a wireless communications system. It should be understood that the embodiments of this application may be implemented in any electronic device or apparatus that may need to code and decode, or code, or decode a video picture.

The apparatus 50 may include a housing 30 configured to accommodate and protect a device. The apparatus 50 may further include a display 32 in a form of a liquid crystal display. In another embodiment of this application, the display may be any proper display technology suitable for displaying a picture or a video. The apparatus 50 may further include a keypad 34. In another embodiment of this application, any proper data or user interface mechanism may be applied. For example, a user interface may be implemented as a virtual keyboard or a data recording system to serve as a part of a touch sensitive display. The apparatus may include a microphone 36 or any proper audio input, and the audio input may be digital or analog signal input. The apparatus 50 may further include the following audio output device, and the audio output device may be any one of the following items in the embodiments of this application: a headset 38, a speaker, or an analog audio or digital audio output connection. The apparatus 50 may also include a battery 40. In another embodiment of this application, the device may be powered by any proper mobile energy device, for example, a solar power battery, a fuel battery, or a clock mechanism generator. The apparatus may further include an infrared port 42 configured to perform short-distance line-of-sight communication with another device. In another embodiment, the apparatus 50 may further include any proper solution for short-distance communication, for example, a Bluetooth wireless connection or a USB/live line wired connection.

The apparatus 50 may include a controller 56 or a processor configured to control the apparatus 50. The controller 56 may be connected to a memory 58. In the embodiments of this application, the memory may store data in a form of a picture and audio data, and/or may store an instruction for execution on the controller 56. The controller 56 may be further connected to a codec circuit 54 suitable for encoding and decoding audio and/or video data or assisting encoding and decoding implemented by the controller 56.

The apparatus 50 may further include a card reader 48 and a smart card 46, for example, a UICC and a UICC reader, that are configured to provide user information and that are suitable for providing authentication information for network authentication and user authorization.

The apparatus 50 may further include a radio interface circuit 52. The radio interface circuit is connected to a controller and is suitable for generating, for example, a wireless communication signal used to communicate with a cellular communication network, a wireless communications system, or a wireless local area network. The apparatus 50 may further include an antenna 44. The antenna is connected to the radio interface circuit 52, and is configured to: send a radio frequency signal generated by the radio interface circuit 52 to another (a plurality of) apparatus and receive a radio frequency signal from another (a plurality of) apparatus.

In some embodiments, the apparatus 50 includes a camera that can record or detect single frames. The codec circuit 54 or a controller receives and processes the single frames. In some embodiments, the apparatus may receive to-be-processed video picture data from another device before transmission and/or storage. In some embodiments, the apparatus 50 may receive, through a wireless or wired connection, a picture for encoding/decoding.

The solution in this embodiment of this application may be applied to various electronic apparatuses. For example, the following provides examples in which this embodiment of this application is applied to a television device and a mobile phone device.

Figure 12:
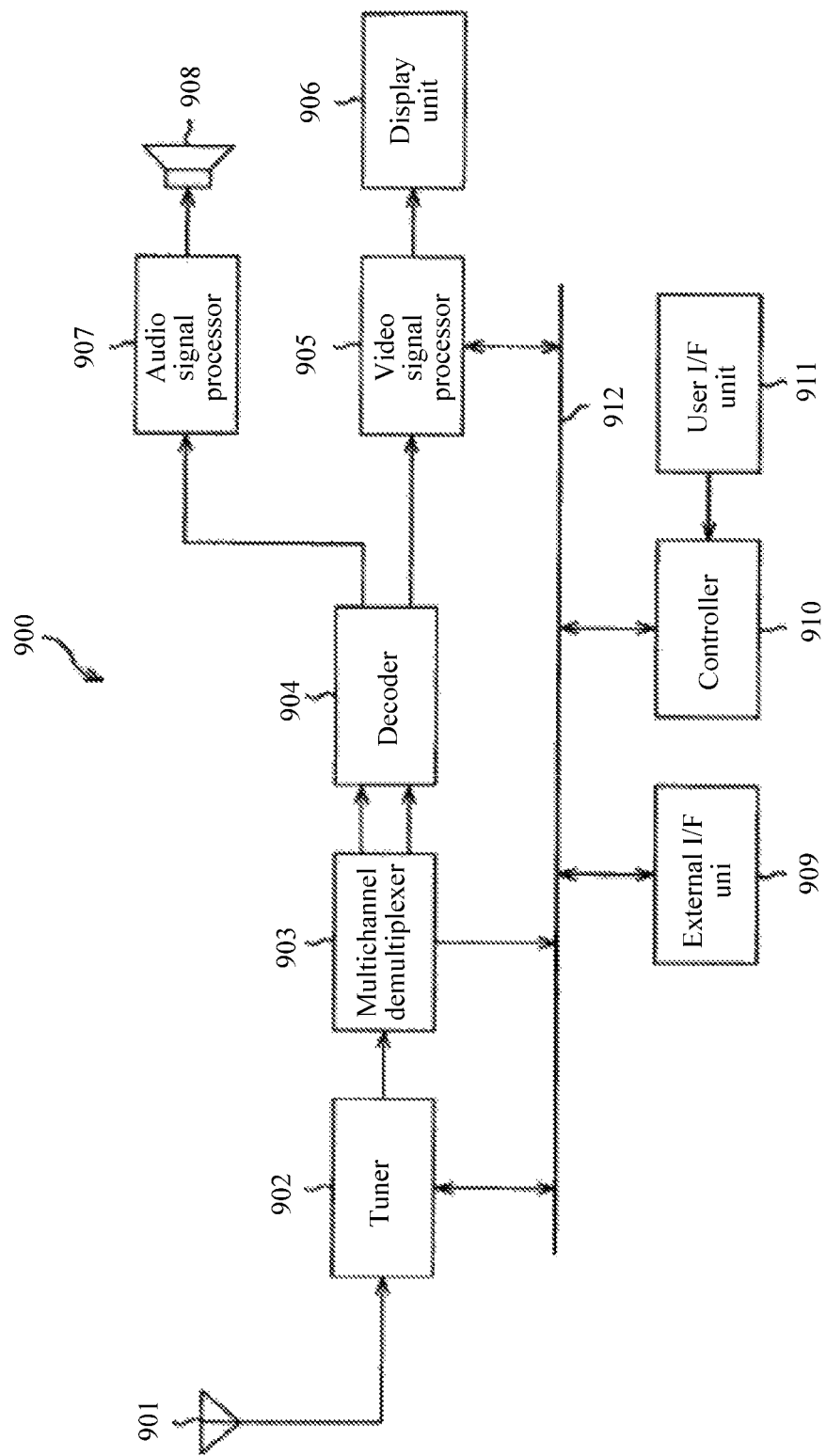
FIG. 12 is a schematic structural diagram of a television application according to one embodiment.

FIG. 12 is a schematic structural diagram of a television application to which an embodiment of this application is applied.

The television device 900 includes an antenna 901, a tuner 902, a multichannel demultiplexer 903, a decoder 904, a video signal processor 905, a display unit 906, an audio signal processor 907, a speaker 908, an external interface 909, a controller 910, a user interface 911, a bus 912, and the like.

The tuner 902 extracts a signal of a desired channel from a broadcast signal received by the antenna 901, and demodulates the extracted signal. The tuner 902 subsequently outputs an encoded bitstream obtained through demodulation to the multichannel demultiplexer 903. That is, the tuner 902 is used as a sending apparatus in the television device 900 receiving an encoded bitstream of an encoded picture.

The multichannel demultiplexer 903 separates a video stream from an audio stream of a to-be-viewed program in the encoded bitstream, and outputs the separated streams to the decoder 904. The multichannel demultiplexer 903 further extracts auxiliary data from the encoded bitstream, for example, an electronic program guide, and provides the extracted data to the controller 910. If the encoded bitstream is scrambled, the multichannel demultiplexer 903 may descramble the encoded bitstream.

The decoder 904 decodes the video stream and the audio stream inputted from the multichannel demultiplexer 903. The decoder 904 subsequently outputs video data generated through decoding to the video signal processor 905. The decoder 904 further outputs audio data generated through decoding to the audio signal processor 907.

The video signal processor 905 reproduces video data inputted from the decoder 904, and displays the video data on the display unit 906. The video signal processor 905 may further display, on the display unit 906, an application picture provided through a network. In addition, the video signal processor 905 may perform additional processing, for example, noise removing, on the video data based on settings. The video signal processor 905 may further generate a GUI (graphical user interface) picture and superimpose the generated picture on an outputted picture.

The display unit 906 is driven by a drive signal provided by the video signal processor 905, and displays a video or a picture on a video screen of a display apparatus, for example, a liquid crystal display, a plasma display, or an organic light-emitting diode (OLED).

The audio signal processor 907 performs reproduction processing, for example, digital-to-analog conversion and amplification, on audio data inputted from the decoder 904, and outputs audio by using the speaker 908. In addition, the audio signal processor 907 may perform additional processing, for example, noise removing, on the audio data.

The external interface 909 is an interface configured to connect the television device 900 to an external apparatus or a network. For example, a video stream or an audio stream received by the external interface 909 may be decoded by the decoder 904. That is, the external interface 909 is also used as a sending apparatus in the television device 900 receiving an encoded bitstream of an encoded picture.

The controller 910 includes a processor and a memory. The memory stores a program to be executed by the processor, program data, auxiliary data, data obtained through a network, and the like. For example, when the television device 900 is started, the program stored in the memory is read and executed by the processor. The processor controls an operation of the television device 900 based on a control signal inputted from the user interface 911.

The user interface 911 is connected to the controller 910. For example, the user interface 911 includes a button and a switch enabling the user to operate the television device 900 and a receiving unit configured to receive a remote control signal. The user interface 911 detects an operation performed by a user through these components, generates a control signal, and outputs the generated control signal to the controller 910.

The bus 912 connects the tuner 902, the multichannel demultiplexer 903, the decoder 904, the video signal processor 905, the audio signal processor 907, the external interface 909, and the controller 910 to each other.

In the television device 900 having this structure, the decoder 904 may have the functions of the video decoding apparatus or the picture prediction apparatus according to the foregoing embodiments. For example, the decoder 904 may be configured to: determine a reference block of a current block, where the reference block and the current block are spatially adjacent, and the reference block is predicted by using an affine motion model; obtain location information and motion information of at least two feature points in the reference block, where the at least two feature points are located in subblocks in which at least two control points in the reference block are located, the at least two control points are control points used in the affine motion model used for the reference block, and motion information of the subblock in which the feature point is located is obtained based on the motion information of the corresponding feature point; calculating motion information of each subblock in the current block based on the location information and the motion information of the at least two feature points in the reference block; and performing motion compensation prediction on each subblock in the current block based on the motion information of each subblock in the current block, to obtain a prediction block of the current block.

Figure 13:
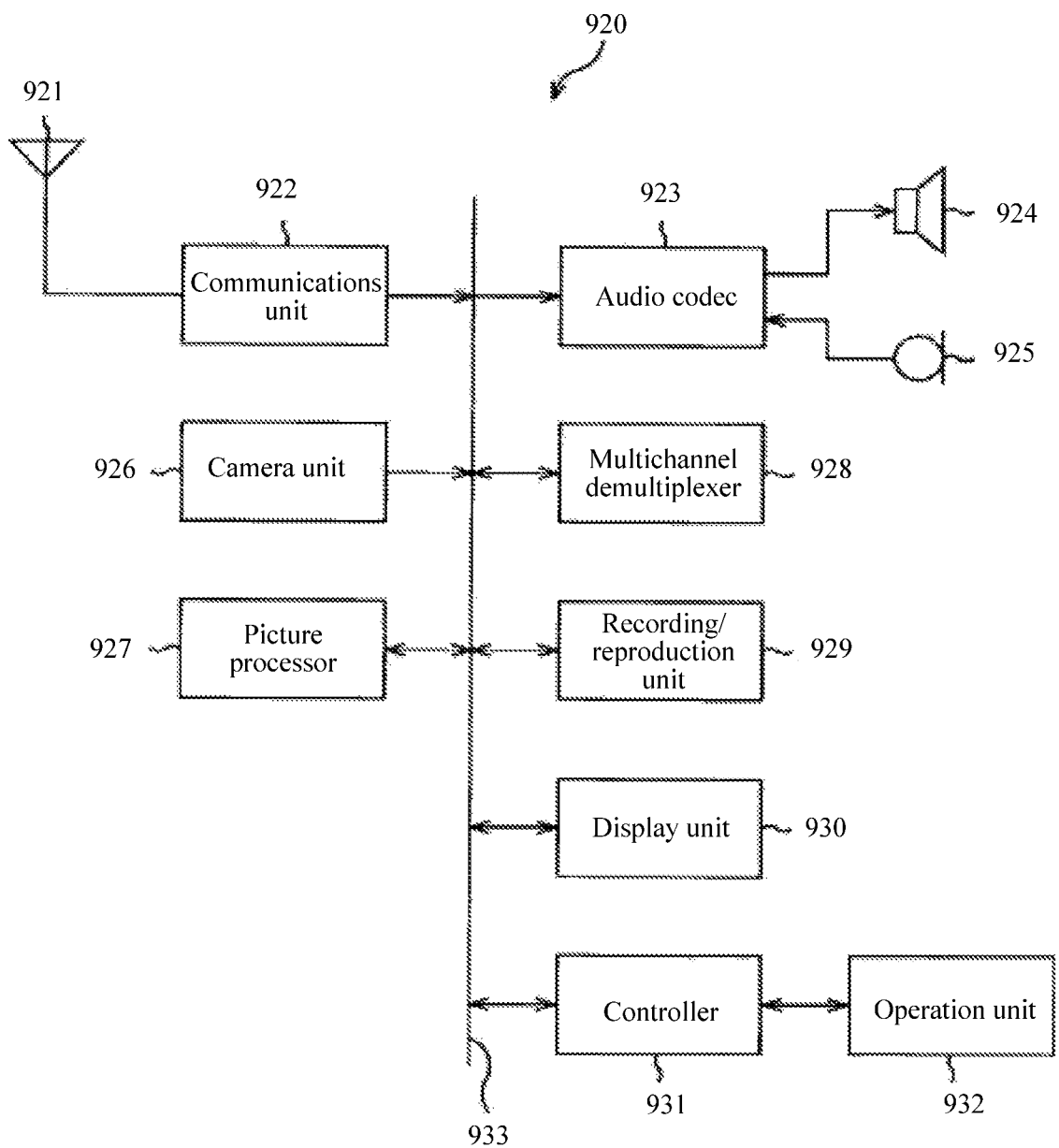
FIG. 13 is a schematic structural diagram of a mobile phone application according to one embodiment.

FIG. 13 is a schematic structural diagram of a mobile phone application to which an embodiment of this application is applied. The mobile phone apparatus 920 may include an antenna 921, a communications unit 922, an audio codec 923, a speaker 924, a microphone 925, a camera unit 926, a picture processor 927, a multichannel demultiplexer 928, a recording/reproduction unit 929, a display unit 930, a controller 931, an operation unit 932, a bus 933, and the like.

The antenna 921 is connected to the communications unit 922. The speaker 924 and the microphone 925 are connected to the audio codec 923. The operation unit 932 is connected to the controller 931. The bus 933 connects the communications unit 922, the audio codec 923, the camera unit 926, the picture processor 927, the multichannel demultiplexer 928, the recording/reproduction unit 929, the display unit 930, and the controller 931 to each other.

The mobile phone apparatus 920 performs an operation, for example, audio signal sending/receiving, email and picture data sending/receiving, picture shooting, and data recording, in various operation modes. The various operation modes include an audio call mode, a data communication mode, an imaging mode, and a video call mode.

In the audio call mode, an analog audio signal generated by the microphone 925 is provided to the audio codec 923. The audio codec 923 converts the analog audio signal to audio data, performs analog to digital conversion on the converted audio data, and compresses the audio data. The audio codec 923 subsequently outputs the audio data obtained as a compression result to the communications unit 922. The communications unit 922 encodes and demodulates the audio data to generate a to-be-sent signal. The communications unit 922 subsequently sends the generated to-be-sent signal to a base station by using the antenna 921. The communications unit 922 further amplifies a wireless electrical signal received by the antenna 921 and performs frequency conversion on the wireless electrical signal received by the antenna 921, to obtain the received signal. The communications unit 922 subsequently demodulates and decodes the received signal, to generate audio data, and outputs the generated audio data to the audio codec 923. The audio codec 923 decompresses the audio data and performs digital-to-analog conversion on the audio data to generate an analog audio signal. The audio codec 923 subsequently provides the generated audio signal to the speaker 924 to output audio from the speaker 924.

In the data communication mode, for example, the controller 931 generates, based on an operation performed by a user by using the operation unit 932, text data to be included in an email. The controller 931 further displays text on the display unit 930. The controller 931 further generates email data in response to a sending instruction entered by a user by using the operation unit 932, and outputs the generated email data to the communications unit 922. The communications unit 922 encodes and demodulates the email data to generate a to-be-sent signal. The communications unit 922 subsequently sends the generated to-be-sent signal to a base station by using the antenna 921. The communications unit 922 further amplifies a wireless electrical signal received by the antenna 921 and performs frequency conversion on the wireless electrical signal received by the antenna 921, to obtain a received signal. The communications unit 922 subsequently demodulates and decodes the received signal to recover the email data, and outputs the recovered email data to the controller 931. The controller 931 displays email content on the display unit 930, and stores the email data in a storage medium of the recording/reproduction unit 929.

The recording/reproduction unit 929 includes a readable/writable storage medium. For example, the storage medium may be an internal storage medium, or may be a storage medium mounted outside, for example, a hard disk, a magnetic disk, a magnetic optical disc, a universal serial bus (USB) storage, or a memory card.

In the imaging mode, the camera unit 926 pictures an object to generate picture data, and outputs the generated picture data to the picture processor 927. The picture processor 927 encodes the picture data inputted from the camera unit 926, and stores an encoded bitstream in a storage medium of the storage/reproduction unit 929.

In the video call mode, the multichannel demultiplexer 928 performs multichannel multiplexing on a video stream encoded by the picture processor 927 and an audio stream inputted from the audio codec 923, and outputs a plurality of multiplexed streams to the communications unit 922. The communications unit 922 encodes and modulates the plurality of multiplexed streams to generate a to-be-sent signal. The communications unit 922 subsequently sends the generated to-be-sent signal to a base station by using the antenna 921. The communications unit 922 further amplifies a wireless electrical signal received by the antenna 921 and performs frequency conversion on the wireless electrical signal received by the antenna 921, to obtain a received signal. The to-be-sent signal and the received signal may include an encoded bitstream. The communications unit 922 subsequently demodulates and decodes the received signal to recover a stream, and outputs the recovered stream to the multichannel demultiplexer 928. The multichannel demultiplexer 928 separates a video stream from an audio stream in an inputted stream, and outputs the video stream to the picture processor 927 and outputs the audio stream to the audio codec 923. The picture processor 927 decodes the video stream to generate video data. The video data is provided to the display unit 930, and a series of pictures are displayed on the display unit 930. The audio codec 923 decompresses the audio stream and performs digital-to-analog conversion on the audio stream to generate an analog audio signal. The audio codec 923 subsequently provides the generated audio signal to the speaker 924, so that the speaker 924 outputs audio.

In the mobile phone apparatus 920 having this structure, the picture processor 927 has the functions of the video coding apparatus (the video encoder and the picture prediction apparatus) and/or the video decoding apparatus (the video decoder) in the foregoing embodiments.

For example, the picture processor 927 may be configured to: determine a reference block of a current block, where the reference block and the current block are spatially adjacent, and the reference block is predicted by using an affine motion model; obtain location information and motion information of at least two feature points in the reference block, where the at least two feature points are located in subblocks in which at least two control points in the reference block are located, the at least two control points are control points used in the affine motion model used for the reference block, and motion information of the subblock in which the feature point is located is obtained based on the motion information of the corresponding feature point; and calculate motion information of each subblock in the current block based on the location information and the motion information of the at least two feature points in the reference block; and perform motion compensation prediction on each subblock in the current block based on the motion information of each subblock in the current block, to obtain a prediction block of the current block.

In the foregoing embodiments, the description of each embodiment has respective focuses. For a part that is not described in detail in an embodiment, reference may be made to related descriptions in other embodiments.

It should be understood that "one embodiment" or "an embodiment" mentioned in the whole specification does not mean that particular features, structures, or characteristics related to this embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner. A person skilled in the art should also appreciate that all the embodiments described in the specification are preferred embodiments, and the related actions and modules are not necessarily mandatory to this application.

It should be understood that certainty sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, the magnetic medium may be a soft disk, a hard disk, or a magnetic tape), an optical medium (for example, an optical disc)), a semiconductor medium (for example, a solid state disk), or the like. In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method of picture prediction, comprising:
    determining a reference block of a current block, wherein the reference block and the current block are spatially adjacent, and the reference block is predicted by using an affine motion model;
    obtaining location information and motion information of at least two feature points in the reference block, wherein the at least two feature points are located in at least two respective subblocks of the reference block in which at least two control points in the reference block are located, the at least two control points are used in the affine motion model used for reconstructing the reference block, and motion information of a subblock of the reference block in which a feature point is located is obtained based on motion information of a corresponding feature point;
    calculating motion information of each subblock in the current block based on the location information and the motion information of the at least two feature points in the reference block; and
    performing motion compensation prediction on each subblock in the current block based on the motion information of each subblock in the current block, to obtain a prediction block of the current block;
    wherein calculating the motion information of each subblock in the current block comprises: calculating the motion information of each subblock in the current block based on the location information and the motion information of the at least two feature points in the reference block and location information of each subblock in the current block;
    wherein calculating the motion information of each subblock in the current block based on the location information and the motion information of the at least two feature points in the reference block and the location information of each subblock in the current block comprises: calculating the motion information of each subblock in the current block with reference to the following formula and based on the location information and the motion information of the at least two feature points in the reference block and the location information of each subblock in the current block:

$$\begin{cases} vx = \frac{vx_1 - vx_0}{x_1' - x_0'} \times (x - x_0') - \frac{vy_1 - vy_0}{x_1' - x_0'} \times (y - y_0') + vx_0 \\ vy = \frac{vy_1 - vy_0}{x_1' - x_0'} \times (x - x_0') + \frac{vx_1 - vx_0}{x_1' - x_0'} \times (y - y_0') + vy_0 \end{cases}, \text{ or}$$

$$\begin{cases} vx = \frac{vx_1 - vx_0}{x_1' - x_0'} \times (x - x_0') + \frac{vx_2 - vx_0}{x_2' - x_0'} \times (y - y_0') + vx_0 \\ vy = \frac{vy_1 - vy_0}{x_1' - x_0'} \times (x - x_0') + \frac{vy_2 - vy_0}{y_2' - y_0'} \times (y - y_0') + vy_0 \end{cases}, \text{ or}$$

$$\begin{cases} vx = \frac{vx_1 - vx_0}{x_1' - x_0'} \times (x - x_0') + \frac{vx_2 - vx_0}{y_2' - y_0'} \times (y - y_0') + \\ \quad \frac{(vx_3 + vx_0) - (vx_1 + vx_2)}{(x_1' - x_0') \times (y_2' - y_0')} \times (x - x_0') \times (y - y_0') + vx_0 \\ vy = \frac{vy_1 - vy_0}{x_1' - x_0'} \times (x - x_0') + \frac{vy_2 - vy_0}{y_2' - y_0'} \times (y - y_0') + \\ \quad \frac{(vy_3 + vy_0) - (vy_1 + vy_2)}{(x_1' - x_0') \times (y_2' - y_0')} \times (x - x_0') \times (y - y_0') + vy_0 \end{cases},$$

wherein the at least two feature points comprise the feature points whose coordinates are $(x_0', y_0')$ and $(x_1', y_1')$ in the reference block; or
the at least two feature points comprise at least two of the feature points whose coordinates are $(x_0', y_0')$, $(x_1', y_1')$, and $(x_2', y_2')$ in the reference block; or
the at least two feature points comprise at least two of the feature points whose coordinates are $(x_0', y_0')$, $(x_1', y_1')$, $(x_2', y_2')$, and $(x_3', y_3')$ in the reference block, wherein $vx_0$ is a horizontal motion vector of the feature point $(x_0', y_0')$, $vy_0$ is a vertical motion vector of the feature point $(x_0', y_0')$; $vx_1$ is a horizontal motion vector of the feature point $(x_1', y_1')$, $vy_1$ is a vertical motion vector of the feature point $(x_1', y_1')$, $vy_2$ is a vertical motion vector of the feature point $(x_2', y_2')$, $vx_2$ is a horizontal motion vector of the feature point $(x_2', y_2')$, $vy_3$ is a vertical motion vector of the feature point $(x_3', y_3')$, and $vx_3$ is a horizontal motion vector of the feature point $(x_3', y_3')$; and
vx is a horizontal motion vector of a subblock whose coordinates are (x,y) in the current block, and vy is a vertical motion vector of the subblock whose coordinates are (x,y) in the current block.

2. The method according to claim 1, wherein the feature point is in a central location of the subblock in which the control point in the reference block is located.

3. The method according to claim 1, wherein
the location information of the feature point in the reference block is obtained by offsetting location information of the control point in the reference block in the following manner: (x',y')=(x+a,y+b), (x,y) are coordinates of a control point in the reference block, (x',y') are coordinates of a feature point in a subblock in which the control point whose coordinates are (x,y) in the reference block is located, a is a horizontal offset, b is a vertical offset, and a and b are not equal to 0.

4. The method according to claim 1, wherein the at least two control points in the reference block comprise at least two of an upper left vertex, an upper right vertex, a lower left vertex, and a lower right vertex of the reference block, and when location coordinates of the upper left vertex of the reference block are $(x_0,y_0)$, a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases}$$

wherein $(x_1,y_1)$ are coordinates of the upper right vertex of the reference block, $(x_2,y_2)$ are coordinates of the lower left vertex of the reference block, and $(x_3,y_3)$ are coordinates of the lower right vertex of the reference block.

5. The method according to claim 1, wherein the at least two feature points comprise feature points whose coordinates are respectively $(x_0',y_0')$ and $(x_1',y_1')$ in the reference block, wherein $$\begin{cases} (x_0', y_0') = (x_0 + N_1/2, y_0 + N_2/2) \\ (x_1', y_1') = (x_1 - N_1/2, y_0 + N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \end{cases},$$

wherein $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, and w is the width of the reference block.

6. The method according to claim 1, wherein the at least two feature points comprise feature points whose coordinates are respectively $(x_0',y_0')$, $(x_1',y_1')$ and $(x_2',y_2')$ in the reference block, wherein $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \end{cases},$$

wherein $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, w is the width of the reference block, and h is the height of the reference block.

7. The method according to claim 1, wherein the at least two feature points comprise feature points whose coordinates are respectively $(x_0',y_0')$, $(x_1',y_1')$, $(x_2',y_2')$, and $(x_3',y_3')$ in the reference block, wherein $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \\ (x_3', y_3') = (x_3 - N_1/2, y_3 - N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \\ (x_3', y_3') = (x_0 + w - N_1/2, y_0 + h - N_2/2) \end{cases},$$

wherein $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, $(x_3,y_3)$ are coordinates of a control point in a subblock in which the feature point $(x_3',y_3')$ in the reference block is located, w is the width of the reference block, and h is the height of the reference block.

8. A method of picture prediction, comprising:
determining a reference block of a current block, wherein the reference block and the current block are spatially adjacent, and the reference block is predicted by using an affine motion model;
obtaining location information and motion information of at least two feature points in the reference block, wherein the at least two feature points are located in at least two respective subblocks of the reference block in which at least two control points in the reference block are located, the at least two control points are used in the affine motion model used for reconstructing the reference block, and motion information of a subblock of the reference block in which a feature point is located is obtained based on motion information of a corresponding feature point;
calculating motion information of each subblock in the current block based on the location information and the motion information of the at least two feature points in the reference block; and
performing motion compensation prediction on each subblock in the current block based on the motion information of each subblock in the current block, to obtain a prediction block of the current block;
wherein calculating the motion information of each subblock in the current block comprises: calculating, based on the location information and the motion information of the at least two feature points in the reference block, motion information of at least two control points used in an affine motion model used for the current block; and calculating the motion information of each subblock in the current block based on location information of each subblock in the current block and the motion information and location information of the at least two control points used in the affine motion model used for the current block;

wherein calculating the motion information of the at least two control points used in the affine motion model used for the current block comprises:

calculating, with reference to the following formula and based on the location information and the motion information of the at least two feature points in the reference block, the motion information of the at least two control points used in the affine motion model used for the current block:

$$\begin{cases} vx_4 = \dfrac{vx_1 - vx_0}{x'_1 - x'_0} \times (x_4 - x'_0) - \dfrac{vy_1 - vy_0}{x'_1 - x'_0} \times (y_4 - y'_0) + vx_0 \\ vy_4 = \dfrac{vy_1 - vy_0}{x'_1 - x'_0} \times (x_4 - x'_0) + \dfrac{vx_1 - vx_0}{x'_1 - x'_0} \times (y_4 - y'_0) + vy_0 \end{cases}$$

$$\begin{cases} vx_5 = \dfrac{vx_1 - vx_0}{x'_1 - x'_0} \times (x_5 - x'_0) - \dfrac{vy_1 - vy_0}{x'_1 - x'_0} \times (y_5 - y'_0) + vx_0 \\ vy_5 = \dfrac{vy_1 - vy_0}{x'_1 - x'_0} \times (x_5 - x'_0) + \dfrac{vx_1 - vx_0}{x'_1 - x'_0} \times (y_5 - y'_0) + vy_0 \end{cases}, \text{ or}$$

$$\begin{cases} vx_4 = \dfrac{vx_1 - vx_0}{x'_1 - x'_0} \times (x_4 - x'_0) + \dfrac{vx_2 - vx_0}{x'_2 - x'_0} \times (y_4 - y'_0) + vx_0 \\ vy_4 = \dfrac{vy_1 - vy_0}{x'_1 - x'_0} \times (x_4 - x'_0) + \dfrac{vy_2 - vy_0}{y'_2 - y'_0} \times (y_4 - y'_0) + vy_0 \end{cases}$$

$$\begin{cases} vx_5 = \dfrac{vx_1 - vx_0}{x'_1 - x'_0} \times (x_5 - x'_0) + \dfrac{vx_2 - vx_0}{x'_2 - x'_0} \times (y_5 - y'_0) + vx_0 \\ vy_5 = \dfrac{vy_1 - vy_0}{x'_1 - x'_0} \times (x_5 - x'_0) + \dfrac{vy_2 - vy_0}{y'_2 - y'_0} \times (y_5 - y'_0) + vy_0 \end{cases}$$

$$\begin{cases} vx_6 = \dfrac{vx_1 - vx_0}{x'_1 - x'_0} \times (x_6 - x'_0) + \dfrac{vx_2 - vx_0}{x'_2 - x'_0} \times (y_6 - y'_0) + vx_0 \\ vy_6 = \dfrac{vy_1 - vy_0}{x'_1 - x'_0} \times (x_6 - x'_0) + \dfrac{vy_2 - vy_0}{y'_2 - y'_0} \times (y_6 - y'_0) + vy_0 \end{cases}, \text{ or}$$

$$\begin{cases} vx_4 = \dfrac{vx_1 - vx_0}{x'_1 - x'_0} \times (x_4 - x'_0) + \dfrac{vx_2 - vx_0}{x'_2 - x'_0} \times (y_4 - y'_0) + \dfrac{(vx_3 + vx_0) - (vx_1 + vx_2)}{(x'_1 - x'_0) \times (y'_2 - y'_0)} \times (x_4 - x'_0) \times (y_4 - y'_0) + vx_0 \\ vy_4 = \dfrac{vy_1 - vy_0}{x'_1 - x'_0} \times (x_4 - x'_0) + \dfrac{vy_2 - vy_0}{y'_2 - y'_0} \times (y_4 - y'_0) + \dfrac{(vy_3 + vy_0) - (vy_1 + vy_2)}{(x'_1 - x'_0) \times (y'_2 - y'_0)} \times (x_4 - x'_0) \times (y_4 - y'_0) + vy_0 \end{cases}$$

$$\begin{cases} vx_5 = \dfrac{vx_1 - vx_0}{x'_1 - x'_0} \times (x_5 - x'_0) + \dfrac{vx_2 - vx_0}{x'_2 - x'_0} \times (y_5 - y'_0) + \dfrac{(vx_3 + vx_0) - (vx_1 + vx_2)}{(x'_1 - x'_0) \times (y'_2 - y'_0)} \times (x_5 - x'_0) \times (y_5 - y'_0) + vx_0 \\ vy_5 = \dfrac{vy_1 - vy_0}{x'_1 - x'_0} \times (x_5 - x'_0) + \dfrac{vy_2 - vy_0}{y'_2 - y'_0} \times (y_5 - y'_0) + \dfrac{(vy_3 + vy_0) - (vy_1 + vy_2)}{(x'_1 - x'_0) \times (y'_2 - y'_0)} \times (x_5 - x'_0) \times (y_5 - y'_0) + vy_0 \end{cases}$$

$$\begin{cases} vx_6 = \dfrac{vx_1 - vx_0}{x'_1 - x'_0} \times (x_6 - x'_0) + \dfrac{vx_2 - vx_0}{x'_2 - x'_0} \times (y_6 - y'_0) + \dfrac{(vx_3 + vx_0) - (vx_1 + vx_2)}{(x'_1 - x'_0) \times (y'_2 - y'_0)} \times (x_6 - x'_0) \times (y_6 - y'_0) + vx_0 \\ vy_6 = \dfrac{vy_1 - vy_0}{x'_1 - x'_0} \times (x_6 - x'_0) + \dfrac{vy_2 - vy_0}{y'_2 - y'_0} \times (y_6 - y'_0) + \dfrac{(vy_3 + vy_0) - (vy_1 + vy_2)}{(x'_1 - x'_0) \times (y'_2 - y'_0)} \times (x_6 - x'_0) \times (y_6 - y'_0) + vy_0 \end{cases}$$

$$\begin{cases} vx_7 = \dfrac{vx_1 - vx_0}{x'_1 - x'_0} \times (x_7 - x'_0) + \dfrac{vx_2 - vx_0}{x'_2 - x'_0} \times (y_7 - y'_0) + \dfrac{(vx_3 + vx_0) - (vx_1 + vx_2)}{(x'_1 - x'_0) \times (y'_2 - y'_0)} \times (x_7 - x'_0) \times (y_7 - y'_0) + vx_0 \\ vy_7 = \dfrac{vy_1 - vy_0}{x'_1 - x'_0} \times (x_7 - x'_0) + \dfrac{vy_2 - vy_0}{y'_2 - y'_0} \times (y_7 - y'_0) + \dfrac{(vy_3 + vy_0) - (vy_1 + vy_2)}{(x'_1 - x'_0) \times (y'_2 - y'_0)} \times (x_7 - x'_0) \times (y_7 - y'_0) + vy_0 \end{cases},$$

wherein the at least two feature points comprise the feature points whose coordinates are) $(x_0',y_0')$ and $(x_1',y_1')$ in the reference block; or the at least two feature points comprise at least two of the feature points whose coordinates are $(x_0',y_0')$, $(x_1',y_1')$, $(x_2',y_2')$, and $(x_3',y_3')$ in the reference block, wherein the at least two feature points comprise at least two of the feature points whose coordinates are $(x_0',y_0')$, $(x_1',y_1')$, and $(x_2',y_2')$ in the reference block; or the at least two control points used in the affine motion model used for the current block comprise control points whose coordinates are respectively $(x_4,y_4)$ and $(x_5,y_5)$ in the current block; the at least two control points used in the affine motion model used for the current block comprise at least two of control points whose coordinates are respectively $(x_4,y_4)$, and $(x_6,y_6)$ in the current block; or the at least two control points used in the affine motion model used for the current block comprise at least two of control points whose coordinates are respectively $(x_4,y_4)$, $(x_5,y_5)$, $(x_6, y_6)$, and $(x_7,y_7)$ in the current block; and $vx_4$ is a horizontal motion vector of the control point $(x_4,y_4)$, $vy_4$ is a vertical motion vector of the control point $(x_4,y_4)$; $vx_5$ is a horizontal motion vector of the control point $(x_5,y_5)$, $vy_5$ is a vertical motion vector of the control point $(x_5,y_5)$, $vx_6$ is a horizontal motion vector of the control point $(x_6,y_6)$, $vy_6$ is a vertical motion vector of the control point $(x_6,y_6)$, $vx_7$ is a horizontal motion vector of the control point $(x_7,y_7)$, and $vy_7$ is a vertical motion vector of the control point $(x_7,y_7)$.

9. The method according to claim 8, wherein calculating the motion information of each subblock in the current block based on location information of each subblock in the current block and the motion information and location information of the at least two control points used in the affine motion model used for the current block comprises:

calculating the motion information of each subblock in the current block with reference to the following formula and based on the location information of each subblock in the current block and the motion information and location information of the at least two control points used in the affine motion model used for the current block:

$$\begin{cases} vx = \frac{vx_5 - vx_4}{x_5 - x_4} \times (x - x_4) - \frac{vy_5 - vy_4}{x_5 - x_4} \times (y - y_4) + vx_4 \\ vy = \frac{vy_5 - vy_4}{x_5 - x_4} \times (x - x_4) + \frac{vx_1 - vx_0}{x_5 - x_4} \times (y - y_4) + vy_4 \end{cases} \text{ or}$$

$$\begin{cases} vx = \frac{vx_5 - vx_4}{x_5 - x_4} \times (x - x_4) + \frac{vx_6 - vx_4}{x_6 - x_4} \times (y - y_4) + vx_4 \\ vy = \frac{vy_5 - vy_4}{x_5 - x_4} \times (x - x_4) + \frac{vy_6 - vy_4}{x_6 - x_4} \times (y - y_4) + vy_4 \end{cases} \text{ or}$$

$$\begin{cases} vx = \frac{vx_5 - vx_4}{x_5 - x_4} \times (x - x_4) + \frac{vx_6 - vx_4}{y_6 - y_4} \times (y - y_4) + \frac{(vx_7 + vx_4) - (vx_5 + vx_6)}{(x_5 - x_4) \times (y_6 - y_4)} \times (x - x_4) \times (y - y_4) + vx_4 \\ vy = \frac{vy_5 - vy_4}{x_5 - x_4} \times (x - x_4) + \frac{vy_6 - vy_4}{y_6 - y_4} \times (y - y_4) + \frac{(vy_7 + vy_4) - (vy_5 + vy_6)}{(x_5 - x_4) \times (y_6 - y_4)} \times (x - x_4) \times (y - y_4) + vy_4 \end{cases},$$

wherein vx is a horizontal motion vector of a subblock whose coordinates are (x,y) in the current block, and vy is a vertical motion vector of the subblock whose coordinates are (x,y) in the current block.

10. The method according to claim 1, wherein the method is applied to a video coding process or a video decoding process.

11. An apparatus for picture prediction, comprising:
one or more processors; and
a memory coupled to the one or more processors to store instructions, which when executed by the one or more processors, cause the one or more processors to:
determine a reference block of a current block, wherein the reference block and the current block are spatially adjacent, and the reference block is predicted by using an affine motion model;
obtain location information and motion information of at least two feature points in the reference block, wherein the at least two feature points are located in at least two respective subblocks of the reference block in which at least two control points in the reference block are located, the at least two control points are control points used in the affine motion model used for the reference block, and motion information of a subblock of the reference block in which a feature point is located is obtained based on motion information of a corresponding feature point;
calculate motion information of each subblock in the current block based on the location information and the motion information of the at least two feature points in the reference block; and
perform motion compensation prediction on each subblock in the current block based on the motion information of each subblock in the current block, to obtain a prediction block of the current block;
wherein to calculate the motion information of each subblock in the current block, the instructions, which when executed by the one or more processors, cause the one or more processors to calculate the motion information of each subblock in the current block based on the location information and the motion information of the at least two feature points in the reference block and location information of each subblock in the current block;
wherein to calculate the motion information of each subblock in the current block based on the location information and the motion information of the at least two feature points in the reference block and the location information of each subblock in the current block, the instructions, which when executed by the one or more processors, cause the one or more processors to calculate the motion information of each subblock in the current block with reference to the following formula and based on the location information and the motion information of the at least two feature points in the reference block and the location information of each subblock in the current block:

$$\begin{cases} vx = \frac{vx_1 - vx_0}{x'_1 - x'_0} \times (x - x'_0) - \frac{vy_1 - vy_0}{x'_1 - x'_0} \times (y - y'_0) + vx_0 \\ vy = \frac{vy_1 - vy_0}{x'_1 - x'_0} \times (x - x'_0) + \frac{vx_1 - vx_0}{x'_1 - x'_0} \times (y - y'_0) + vy_0 \end{cases}, \text{ or}$$

$$\begin{cases} vx = \frac{vx_1 - vx_0}{x'_1 - x'_0} \times (x - x'_0) + \frac{vx_2 - vx_0}{x'_2 - x'_0} \times (y - y'_0) + vx_0 \\ vy = \frac{vy_1 - vy_0}{x'_1 - x'_0} \times (x - x'_0) + \frac{vy_2 - vy_0}{y'_2 - y'_0} \times (y - y'_0) + vy_0 \end{cases}, \text{ or}$$

$$\begin{cases} vx = \frac{vx_1 - vx_0}{x'_1 - x'_0} \times (x - x'_0) + \frac{vx_2 - vx_0}{y'_2 - y'_0} \times (y - y'_0) + \frac{(vx_3 + vx_0) - (vx_1 + vx_2)}{(x'_1 - x'_0) \times (y'_2 - y'_0)} \times (x - x'_0) \times (y - y'_0) + vx_0 \\ vy = \frac{vy_1 - vy_0}{x'_1 - x'_0} \times (x - x'_0) + \frac{vy_2 - vy_0}{y'_2 - y'_0} \times (y - y'_0) + \frac{(vy_3 + vy_0) - (vy_1 + vy_2)}{(x'_1 - x'_0) \times (y'_2 - y'_0)} \times (x - x'_0) \times (y - y'_0) + vy_0 \end{cases},$$

wherein the at least two feature points comprise the feature points whose coordinates are $(x_0', y_0')$ and $(x_1', y_1')$ in the reference block; or the at least two feature points comprise at least two of the feature points whose coordinates are $(x_0', y_0')$, $(x_1', y_1')$, and $(x_2', y_2')$ in the reference block; or the at least two feature points comprise at least two of the feature points whose coordinates are $(x_0', y_0')$, $(x_1', y_1')$, $(x_2', y_2')$, and $(x_3', y_3')$ in the reference block, wherein $vx_0$ is a horizontal motion vector of the feature point $(x_0', y_0')$, $vy_0$ is a vertical motion vector of the feature point $(x_0', y_0')$; $vx_1$ is a horizontal motion vector of the feature point $(x_1', y_1')$, $vy_1$ is a vertical motion vector of the feature point $(x_1', y_1')$, $vy_2$ is a vertical motion vector of the feature point $(x_2', y_2')$, $vx_2$ is a horizontal motion vector of the feature point $(x_2', y_2')$, $vy_3$ is a vertical motion vector of the feature point $(x_3', y_3')$, and $vx_3$ is a horizontal motion vector of the feature point $(x_3', y_3')$; and vx is a horizontal motion vector of a subblock whose coordinates are (x,y) in the current block, and vy is a vertical motion vector of the subblock whose coordinates are (x,y) in the current block.

12. The apparatus according to claim 11, wherein the feature point is in a central location of the subblock in which the control point in the reference block is located.

13. The apparatus according to claim 11, wherein the location information of the feature point in the reference block is obtained by offsetting location information of the control point in the reference block in the following manner: (x',y')=(x+a,y+b), (x,y) are coordinates of a control point in the reference block, (x',y') are coordinates of a feature point in a subblock in which the control point whose coordinates are (x,y) in the reference block is located, a is a horizontal offset, b is a vertical offset, and a and b are not equal to 0.

14. The apparatus according to claim 11, wherein the at least two control points in the reference block comprise at least two of an upper left vertex, an upper right vertex, a lower left vertex, and a lower right vertex of the reference block, and when location coordinates of the upper left vertex of the reference block are $(x_0, y_0)$, a width of the reference block is w, and a height of the reference block is h, $$\begin{cases} (x_1, y_1) = (x_0 + w, y_0) \\ (x_2, y_2) = (x_0, y_0 + h) \\ (x_3, y_3) = (x_0 + w, y_0 + h) \end{cases},$$

wherein $(x_1, y_1)$ are coordinates of the upper right vertex of the reference block, $(x_2, y_2)$ are coordinates of the lower left vertex of the reference block, and $(x_3, y_3)$ are coordinates of the lower right vertex of the reference block.

15. The apparatus according to claim 11, wherein the at least two feature points comprise feature points whose coordinates are respectively $(x_0', y_0')$ and $(x_1', y_1')$ in the reference block, wherein $$\begin{cases} (x_0', y_0') = (x_0 + N_1/2, y_0 + N_2/2) \\ (x_1', y_1') = (x_1 - N_1/2, y_1 + N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \end{cases},$$

wherein $N_1$ is a width of the subblock in which the control point in the reference block is located, $N_2$ is a height of the subblock in which the control point in the reference block is located, $(x_0, y_0)$ are coordinates of a control point in a subblock in which the feature point) $(x_0', y_0')$ in the reference block is located, $(x_1, y_1)$ are coordinates of a control point in a subblock in which the feature point $(x_1', y_1')$ in the reference block is located, and w is the width of the reference block.

16. The apparatus according to claim 11, wherein the at least two feature points comprise feature points whose coordinates are respectively $(x_0', y_0')$, $(x_1', y_1')$, and $(x_2', y_2')$ in the reference block, wherein $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \end{cases},$$

wherein $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, w is the width of the reference block, and h is the height of the reference block.

17. The apparatus according to claim 11, wherein the at least two feature points comprise feature points whose coordinates are respectively $(x_0',y_0')$, $(x_1',y_1')$, $(x_2',y_2')$, and $(x_3',y_3')$ in the reference block, wherein $$\begin{cases} (x_0', y_0') = (x_0 + N_1/2, y_0 + N_2/2) \\ (x_1', y_1') = (x_1 - N_1/2, y_1 + N_2/2) \\ (x_2', y_2') = (x_2 + N_1/2, y_2 - N_2/2) \\ (x_3', y_3') = (x_3 - N_1/2, y_3 - N_2/2) \end{cases}, \text{ or}$$

$$\begin{cases} (x_0', y_0') = (x_0 + N_1/2, y_0 + N_2/2) \\ (x_1', y_1') = (x_0 + w - N_1/2, y_0 + N_2/2) \\ (x_2', y_2') = (x_0 + N_1/2, y_0 + h - N_2/2) \\ (x_3', y_3') = (x_0 + w - N_1/2, y_0 + h - N_2/2) \end{cases},$$

wherein $N_1$ is a width of the subblock in which the control point in the reference block is located, $N_2$ is a height of the subblock in which the control point in the reference block is located, $(x_0,y_0)$ are coordinates of a control point in a subblock in which the feature point $(x_0',y_0')$ in the reference block is located, $(x_1,y_1)$ are coordinates of a control point in a subblock in which the feature point $(x_1',y_1')$ in the reference block is located, $(x_2,y_2)$ are coordinates of a control point in a subblock in which the feature point $(x_2',y_2')$ in the reference block is located, $(x_3,y_3)$ are coordinates of a control point in a subblock in which the feature point $(x_3',y_3')$ in the reference block is located, w is the width of the reference block, and h is the height of the reference block.

18. An apparatus for picture prediction, comprising:
one or more processors; and
a memory coupled to the one or more processors to store instructions, which when executed by the one or more processors, cause the one or more processors to:

determine a reference block of a current block, wherein the reference block and the current block are spatially adjacent, and the reference block is predicted by using an affine motion model;

obtain location information and motion information of at least two feature points in the reference block, wherein the at least two feature points are located in at least two respective subblocks of the reference block in which at least two control points in the reference block are located, the at least two control points are control points used in the affine motion model used for the reference block, and motion information of a subblock of the reference block in which a feature point is located is obtained based on motion information of a corresponding feature point;

calculate motion information of each subblock in the current block based on the location information and the motion information of the at least two feature points in the reference block; and perform motion compensation prediction on each subblock in the current block based on the motion information of each subblock in the current block, to obtain a prediction block of the current block;

wherein to calculate the motion information of each subblock in the current block, the instructions, which when executed by the one or more processors, cause the one or more processors to: calculate, based on the location information and the motion information of the at least two feature points in the reference block, motion information of at least two control points used in an affine motion model used for the current block; and calculate the motion information of each subblock in the current block based on location information of each subblock in the current block and the motion information and location information of the at least two control points used in the affine motion model used for the current block;

wherein to calculate the motion information of the at least two control points used in the affine motion model used for the current block, the instructions, which when executed by the one or more processors, cause the one or more processors to calculate, with reference to the following formula and based on the location information and the motion information of the at least two feature points in the reference block, the motion information of the at least two control points used in the affine motion model used for the current block:

$$\begin{cases} vx_4 = \frac{vx_1 - vx_0}{x_1' - x_0'} \times (x_4 - x_0') - \frac{vy_1 - vy_0}{x_1' - x_0'} \times (y_4 - y_0') + vx_0 \\ vy_4 = \frac{vy_1 - vy_0}{x_1' - x_0'} \times (x_4 - x_0') + \frac{vx_1 - vx_0}{x_1' - x_0'} \times (y_4 - y_0') + vy_0 \end{cases}$$

$$\begin{cases} vx_5 = \frac{vx_1 - vx_0}{x_1' - x_0'} \times (x_5 - x_0') - \frac{vy_1 - vy_0}{x_1' - x_0'} \times (y_5 - y_0') + vx_0 \\ vy_5 = \frac{vy_1 - vy_0}{x_1' - x_0'} \times (x_5 - x_0') + \frac{vx_1 - vx_0}{x_1' - x_0'} \times (y_5 - y_0') + vy_0 \end{cases}, \text{ or}$$

$$\begin{cases} vx_4 = \frac{vx_1 - vx_0}{x_1' - x_0'} \times (x_4 - x_0') + \frac{vx_2 - vx_0}{x_2' - x_0'} \times (y_4 - y_0') + vx_0 \\ vy_4 = \frac{vy_1 - vy_0}{x_1' - x_0'} \times (x_4 - x_0') + \frac{vy_2 - vy_0}{y_2' - y_0'} \times (y_4 - y_0') + vy_0 \end{cases}$$

-continued $$\begin{cases} vx_5 = \frac{vx_1 - vx_0}{x_1' - x_0'} \times (x_5 - x_0') + \frac{vx_2 - vx_0}{x_2' - x_0'} \times (y_5 - y_0') + vx_0 \\ vy_5 = \frac{vy_1 - vy_0}{x_1' - x_0'} \times (x_5 - x_0') + \frac{vy_2 - vy_0}{y_2' - y_0'} \times (y_5 - y_0') + vy_0 \end{cases}$$

$$\begin{cases} vx_6 = \frac{vx_1 - vx_0}{x_1' - x_0'} \times (x_6 - x_0') + \frac{vx_2 - vx_0}{x_2' - x_0'} \times (y_6 - y_0') + vx_0 \\ vy_6 = \frac{vy_1 - vy_0}{x_1' - x_0'} \times (x_6 - x_0') + \frac{vy_2 - vy_0}{y_2' - y_0'} \times (y_6 - y_0') + vy_0 \end{cases}, \text{ or}$$

$$\begin{cases} vx_4 = \frac{vx_1 - vx_0}{x_1' - x_0'} \times (x_4 - x_0') + \frac{vx_2 - vx_0}{x_2' - x_0'} \times (y_4 - y_0') + \frac{(vx_3 + vx_0) - (vx_1 + vx_2)}{(x_1' - x_0') \times (y_2' - y_0')} \times (x_4 - x_0') \times (y_4 - y_0') + vx_0 \\ vy_4 = \frac{vy_1 - vy_0}{x_1' - x_0'} \times (x_4 - x_0') + \frac{vy_2 - vy_0}{y_2' - y_0'} \times (y_4 - y_0') + \frac{(vy_3 + vy_0) - (vy_1 + vy_2)}{(x_1' - x_0') \times (y_2' - y_0')} \times (x_4 - x_0') \times (y_4 - y_0') + vy_0 \end{cases}$$

$$\begin{cases} vx_5 = \frac{vx_1 - vx_0}{x_1' - x_0'} \times (x_5 - x_0') + \frac{vx_2 - vx_0}{x_2' - x_0'} \times (y_5 - y_0') + \frac{(vx_3 + vx_0) - (vx_1 + vx_2)}{(x_1' - x_0') \times (y_2' - y_0')} \times (x_5 - x_0') \times (y_5 - y_0') + vx_0 \\ vy_5 = \frac{vy_1 - vy_0}{x_1' - x_0'} \times (x_5 - x_0') + \frac{vy_2 - vy_0}{y_2' - y_0'} \times (y_5 - y_0') + \frac{(vy_3 + vy_0) - (vy_1 + vy_2)}{(x_1' - x_0') \times (y_2' - y_0')} \times (x_5 - x_0') \times (y_5 - y_0') + vy_0 \end{cases}$$

$$\begin{cases} vx_6 = \frac{vx_1 - vx_0}{x_1' - x_0'} \times (x_6 - x_0') + \frac{vx_2 - vx_0}{x_2' - x_0'} \times (y_6 - y_0') + \frac{(vx_3 + vx_0) - (vx_1 + vx_2)}{(x_1' - x_0') \times (y_2' - y_0')} \times (x_6 - x_0') \times (y_6 - y_0') + vx_0 \\ vy_6 = \frac{vy_1 - vy_0}{x_1' - x_0'} \times (x_6 - x_0') + \frac{vy_2 - vy_0}{y_2' - y_0'} \times (y_6 - y_0') + \frac{(vy_3 + vy_0) - (vy_1 + vy_2)}{(x_1' - x_0') \times (y_2' - y_0')} \times (x_6 - x_0') \times (y_6 - y_0') + vy_0 \end{cases}$$

$$\begin{cases} vx_7 = \frac{vx_1 - vx_0}{x_1' - x_0'} \times (x_7 - x_0') + \frac{vx_2 - vx_0}{x_2' - x_0'} \times (y_7 - y_0') + \frac{(vx_3 + vx_0) - (vx_1 + vx_2)}{(x_1' - x_0') \times (y_2' - y_0')} \times (x_7 - x_0') \times (y_7 - y_0') + vx_0 \\ vy_7 = \frac{vy_1 - vy_0}{x_1' - x_0'} \times (x_7 - x_0') + \frac{vy_2 - vy_0}{y_2' - y_0'} \times (y_7 - y_0') + \frac{(vy_3 + vy_0) - (vy_1 + vy_2)}{(x_1' - x_0') \times (y_2' - y_0')} \times (x_7 - x_0') \times (y_7 - y_0') + vy_0 \end{cases},$$

wherein the at least two feature points comprise the feature points whose coordinates are $(x_0', y_0')$ and $(x_1', y_1')$ in the reference block; or the at least two feature points comprise at least two of the feature points whose coordinates are $(x_0', y_0')$, $(x_1', y_1')$, and $(x_2', y_2')$ in the reference block; or the at least two feature points comprise at least two of the feature points whose coordinates are $(x_0', y_0')$, $(x_1', y_1')$, $(x_2', y_2')$, and $(x_3', y_3')$ in the reference block, wherein the at least two control points used in the affine motion model used for the current block comprise control points whose coordinates are respectively $(x_4, y_4)$ and $(x_5, y_5)$ in the current block; the at least two control points used in the affine motion model used for the current block comprise at least two of control points whose coordinates are respectively $(x_4, y_4)$, $(x_5, y_5)$, and $(x_6, y_6)$ in the current block; or the at least two control points used in the affine motion model used for the current block comprise at least two of control points whose coordinates are respectively $(x_4, y_4)$, $(x_5, y_5)$, $(x_6, y_6)$, and $(x_7, y_7)$ in the current block; and $vx_4$ is a horizontal motion vector of the control point $(x_4, y_4)$, $vy_4$ is a vertical motion vector of the control point $(x_4, y_4)$; $vx_5$ is a horizontal motion vector of the control point $(x_5, y_5)$, $vy_5$ is a vertical motion vector of the control point $(x_5, y_5)$, $vx_6$ is a horizontal motion vector of the control point $(x_6, y_6)$, $vy_6$ is a vertical motion vector of the control point $(x_6, y_6)$, $vx_7$ is a horizontal motion vector of the control point $(x_7, y_7)$, and $vy_7$ is a vertical motion vector of the control point $(x_7, y_7)$.

19. The apparatus according to claim 18, wherein to calculate the motion information of each subblock in the current block based on the location information of each subblock in the current block and the motion information and the location information of the at least two control points used in the affine motion model used for the current block, the instructions, which when executed by the one or more processors, cause the one or more processors to calculate the motion information of each subblock in the current block with reference to the following formula and based on the location information of each subblock in the current block and the motion information and the location information of the at least two control points used in the affine motion model used for the current block:

$$\begin{cases} vx = \frac{vx_5 - vx_4}{x_5 - x_4} \times (x - x_4) - \frac{vy_5 - vy_4}{x_5 - x_4} \times (y - y_4) + vx_4 \\ vy = \frac{vy_5 - vy_4}{x_5 - x_4} \times (x - x_4) + \frac{vx_5 - vx_4}{x_5 - x_4} \times (y - y_4) + vy_4 \end{cases}, \text{ or}$$

$$\begin{cases} vx = \frac{vx_5 - vx_4}{x_5 - x_4} \times (x - x_4) + \frac{vx_6 - vx_4}{x_6 - x_4} \times (y - y_4) + vx_4 \\ vy = \frac{vy_5 - vy_4}{x_5 - x_4} \times (x - x_4) + \frac{vy_6 - vy_4}{x_6 - x_4} \times (y - y_4) + vy_4 \end{cases}, \text{ or}$$

$$\begin{cases} vx = \dfrac{vx_5 - vx_4}{x_5 - x_4} \times (x - x_4) + \dfrac{vx_6 - vx_4}{y_6 - y_4} \times (y - y_4) + \dfrac{(vx_7 + vx_4) - (vx_5 + vx_6)}{(x_5 - x_4) \times (y_6 - y_4)} \times (x - x_4) \times (y - y_4) + vx_4 \\ vy = \dfrac{vy_5 - vy_4}{x_5 - x_4} \times (x - x_4) + \dfrac{vy_6 - vy_4}{y_6 - y_4} \times (y - y_4) + \dfrac{(vy_7 + vy_4) - (vy_5 + vxy_6)}{(x_5 - x_4) \times (y_6 - y_4)} \times (x - x_4) \times (y - y_4) + vy_4 \end{cases},$$

wherein vx is a horizontal motion vector of a subblock whose coordinates are (x,y) in the current block, and vy is a vertical motion vector of the subblock whose coordinates are (x,y) in the current block.

20. The apparatus according to claim 11, wherein the apparatus is applied to a video coding apparatus or a video decoding apparatus.

21. A non-transitory computer-readable storage medium having a computer program stored therein, which when executed by related hardware, cause the related hardware to perform operations, the operations comprising:
   determining a reference block of a current block, wherein the reference block and the current block are spatially adjacent, and the reference block is predicted by using an affine motion model;
   obtaining location information and motion information of at least two feature points in the reference block, wherein the at least two feature points are located in at least two respective subblocks of the reference block in which at least two control points in the reference block are located, the at least two control points are used in the affine motion model used for reconstructing the reference block, and motion information of a subblock of the reference block in which a feature point is located is obtained based on motion information of a corresponding feature point;
   calculating motion information of each subblock in the current block based on the location information and the motion information of the at least two feature points in the reference block; and
   performing motion compensation prediction on each subblock in the current block based on the motion information of each subblock in the current block, to obtain a prediction block of the current block;
   wherein calculating the motion information of each subblock in the current block comprises: calculating the motion information of each subblock in the current block based on the location information and the motion information of the at least two feature points in the reference block and location information of each subblock in the current block;
   wherein calculating the motion information of each subblock in the current block based on the location information and the motion information of the at least two feature points in the reference block and the location information of each subblock in the current block comprises: calculating the motion information of each subblock in the current block with reference to the following formula and based on the location information and the motion information of the at least two feature points in the reference block and the location information of each subblock in the current block:

$$\begin{cases} vx = \dfrac{vx_1 - vx_0}{x_1' - x_0'} \times (x - x_0') - \dfrac{vy_1 - vy_0}{x_1' - x_0'} \times (y - y_0') + vx_0 \\ vy = \dfrac{vy_1 - vy_0}{x_1' - x_0'} \times (x - x_0') + \dfrac{vx_1 - vx_0}{x_1' - x_0'} \times (y - y_0') + vy_0 \end{cases}, \text{ or}$$

$$\begin{cases} vx = \dfrac{vx_1 - vx_0}{x_1' - x_0'} \times (x - x_0') + \dfrac{vx_2 - vx_0}{x_2' - x_0'} \times (y - y_0') + vx_0 \\ vy = \dfrac{vy_1 - vy_0}{x_1' - x_0'} \times (x - x_0') + \dfrac{vy_2 - vy_0}{y_2' - y_0'} \times (y - y_0') + vy_0 \end{cases}, \text{ or}$$

$$\begin{cases} vx = \dfrac{vx_1 - vx_0}{x_1' - x_0'} \times (x - x_0') + \dfrac{vx_2 - vx_0}{y_2' - y_0'} \times (y - y_0') + \\ \dfrac{(vx_3 + vx_0) - (vx_1 + vx_2)}{(x_1' - x_0') \times (y_2' - y_0')} \times (x - x_0') \times (y - y_0') + vx_0 \\ vy = \dfrac{vy_1 - vy_0}{x_1' - x_0'} \times (x - x_0') + \dfrac{vy_2 - vy_0}{y_2' - y_0'} \times (y - y_0') + \\ \dfrac{(vy_3 + vy_0) - (vy_1 + vy_2)}{(x_1' - x_0') \times (y_2' - y_0')} \times (x - x_0') \times (y - y_0') + vy_0 \end{cases},$$

wherein the at least two feature points comprise the feature points whose coordinates are $(x_0',y_0')$ and $(x_1',y_1')$ in the reference block; or
the at least two feature points comprise at least two of the feature points whose coordinates are $(x_0',y_0')$, $(x_1',y_1')$, and $(x_2',y_2')$ in the reference block; or
the at least two feature points comprise at least two of the feature points whose coordinates are $(x_0',y_0')$, $(x_1',y_1')$, $(x_2',y_2')$, and $(x_3',y_3')$ in the reference block, wherein
$vx_0$ is a horizontal motion vector of the feature point $(x_0',y_0')$, $vy_0$ is a vertical motion vector of the feature point $(x_0',y_0')$; $vx_1$ is a horizontal motion vector of the feature point $(x_1',y_1')$, $vy_1$ is a vertical motion vector of the feature point $(x_1',y_1')$, $vy_2$ is a vertical motion vector of the feature point $(x_2',y_2')$, $vx_2$ is a horizontal motion vector of the feature point $(x_2',y_2')$, $vy_3$ is a vertical motion vector of the feature point $(x_3',y_3')$, and $vx_3$ is a horizontal motion vector of the feature point $(x_3',y_3')$; and
vx is a horizontal motion vector of a subblock whose coordinates are (x,y) in the current block, and vy is a vertical motion vector of the subblock whose coordinates are (x,y) in the current block.

* * * * *

UNITED STATES PATENT AND TRADEMARK OFFICE
CERTIFICATE OF CORRECTION

PATENT NO. : 11,330,285 B2
APPLICATION NO. : 16/460029
DATED : May 10, 2022
INVENTOR(S) : Huanbang Chen et al.

It is certified that error appears in the above-identified patent and that said Letters Patent is hereby corrected as shown below:

In the Claims

In Claim 5 Column 43, Line 33-34, "$\begin{cases} (x'_0, y'_0) = (x_0 + N_1/2, y_0 + N_2/2) \\ (x'_1, y'_1) = (x_1 - N_1/2, y_0 + N_2/2) \end{cases}$" should be --$\begin{cases} (x'_0, y'_0) = (x_0 + N_1/2, y_0 + N_2/2) \\ (x'_1, y'_1) = (x_1 - N_1/2, y_1 + N_2/2) \end{cases}$--.

Signed and Sealed this
Twenty-second Day of November, 2022

Katherine Kelly Vidal
Director of the United States Patent and Trademark Office